United States Patent
Imaeda et al.

(10) Patent No.: US 7,223,169 B2
(45) Date of Patent: May 29, 2007

(54) PROGRAM FOR CONTROLLING EXECUTION OF A GAME, AND A GAME MACHINE FOR EXECUTING THE PROGRAM

(75) Inventors: Kenichi Imaeda, Tokyo (JP); Makoto Sugawara, Tokyo (JP)

(73) Assignee: Sega Corporation, Tokyo (JP)

( * ) Notice: Subject to any disclaimer, the term of this patent is extended or adjusted under 35 U.S.C. 154(b) by 797 days.

(21) Appl. No.: 10/273,089

(22) Filed: Oct. 18, 2002

(65) Prior Publication Data

US 2003/0040349 A1 Feb. 27, 2003

Related U.S. Application Data

(63) Continuation of application No. PCT/JP02/01586, filed on Feb. 22, 2002.

(30) Foreign Application Priority Data

Feb. 22, 2001 (JP) .............................. 2001-047449

(51) Int. Cl.
*A63F 13/00* (2006.01)
*A63F 9/24* (2006.01)

(52) U.S. Cl. ............................ 463/3; 463/30; 434/247; 434/252; 473/222; 473/409

(58) Field of Classification Search ...................... None
See application file for complete search history.

(56) References Cited

U.S. PATENT DOCUMENTS 5,269,519 A * 12/1993 Malone ....................... 473/154

(Continued)

FOREIGN PATENT DOCUMENTS

EP 0 814 433 A2 12/1997

(Continued)

OTHER PUBLICATIONS

Microsoft Corporation: "Links 2001 Player's Manual" [Online], Oct. 24, 2000, Retrieved from the Internet: URL: www.replacementdocs.com, p. 13-17.

(Continued)

*Primary Examiner*—Mark Sager
(74) *Attorney, Agent, or Firm*—Dickstein Shapiro LLP

(57) ABSTRACT

Provided are a program and an information processing apparatus for controlling execution of a ball sports simulation game that can provide for a player sensations similar to those experienced when actually playing the sports. The program executed in the information processing apparatus includes the steps of detecting a ball striking strength and a ball operating angle for hitting a golf ball, which are set by a player using an input device; detecting a ball striking operation value and a ball striking angle for said golf ball at the time of hitting said golf ball, which are set by said player using the input device; performing a correction of a specific distance in accordance with said ball striking operation value at the time of hitting said ball to a traveling distance of said ball corresponding to said detected ball striking strength; and determining a flight mode of said ball based on said ball operating angle and said ball striking angle at the time of hitting said ball, which are set by said player using the input device.

5 Claims, 20 Drawing Sheets

U.S. PATENT DOCUMENTS

| | | | | |
|---|---|---|---|---|
| 5,435,554 | A | * | 7/1995 | Lipson .......................... 463/3 |
| 5,507,485 | A | * | 4/1996 | Fisher ....................... 473/407 |
| 5,906,547 | A | | 5/1999 | Tynan et al. |
| 5,984,794 | A | * | 11/1999 | Miremadi ................... 473/199 |
| 6,217,444 | B1 | * | 4/2001 | Kataoka et al. ................ 463/3 |
| 6,267,674 | B1 | | 7/2001 | Kondo et al. |

FOREIGN PATENT DOCUMENTS

| | | |
|---|---|---|
| JP | 04241885 | 8/1992 |
| JP | 10151277 | 6/1998 |
| JP | 10-272258 | 10/1998 |
| JP | 2000-157745 | 6/2000 |
| WO | WO 95/35141 | 12/1995 |

OTHER PUBLICATIONS

Partial European Search Report, dated Jul. 20, 2006.
"Game Boy Complete Series 39 Mario Golf GB How To Win", Oct. 15, 1999.
"The Golf Pro", Monthly ASCII DOS/V Issue, Aug. 1, 1998.
"Golf, Golf, Golf", Home Computer Basic Magazine, October Issue, Oct. 1, 1989.
"Konami Official Guide: Perfect Series Real to Life Power Pro Baseball" 7th Ultimate, Edition: Perfect Guide, Feb. 15; 2001.

* cited by examiner

A

B

C

PROGRAM FOR CONTROLLING EXECUTION OF A GAME, AND A GAME MACHINE FOR EXECUTING THE PROGRAM

This application is a continuation of international application number PCT JP02/01586, filed Feb. 22, 2002.

BACKGROUND OF THE INVENTION

1. Field of the Invention

The present invention relates to a program for controlling execution of a game using an information processing apparatus. In particular, the present invention relates to a game program for performing a ball sports simulation game using a game machine serving as an information processing apparatus that can make it possible for the operation of the game to convey players of the program sensations similar to those the players would experience while actually playing sports.

2. Related Background Arts

Various types of game machines which serve as information processing apparatuses have been developed which permit players to perform sports simulation games. For example, golf games and baseball games have been produced as games in which balls are handled.

For these games, input devices having general functions, i.e., a command input key button for establishing an entry, a cross-shaped key for issuing directional instructions, etc. are employed.

While a predetermined setting can be provided in advance by using these input keys, a player is permitted to determine the timing for a shot made with a golf ball or for hitting a baseball.

For actual sports, it is requested that the direction and the strength of the shot made using a golf ball or the hitting of a baseball should be adjusted, while taking into account the topographical condition of a golf course or the type of pitch that is delivered.

SUMMARY OF THE INVENTION

It is, therefore, one objective of the present invention to provide a program for controlling execution of a ball sports simulation game that can provide for a player sensations similar to those experienced when actually playing the sports, and an information processing apparatus which employs this program.

To achieve this objective, according to a first aspect of the present invention, a program for controlling execution of a golf simulation game using an information processing apparatus, includes the steps of:

By a controller,

Detecting a ball striking strength and a ball operating angle for hitting a golf ball which are set by a player using an input device;

detecting a ball striking operation value and a ball striking angle for the golf ball at the time of hitting the golf ball, which are set by the player using the input device;

performing a correction of a specific distance in accordance with the ball striking operation value at the time of hitting the ball to a traveling distance of the ball corresponding to the detected ball striking strength; and determining a flight mode of the ball based on the ball operating angle and the ball striking angle at the time of hitting the ball, which are set by the player using the input device.

According to a second aspect of the present invention, an analog value in −Y direction is provided by the input device as the ball striking strength set by the player, an analog value in +Y direction is provided by the input device as the ball striking operation value at the time of hitting the ball, an analog value in +X or −X direction is provided by the input device as the ball operating angle set by the player, another analog value in +X or −X direction is provided as the ball striking angle set by the player, and the correction of the specific distance performed by the controlling device is determined as a ratio of the analog value in +Y direction to the absolute value of the analog value in −Y direction, based on the first aspect of the present invention.

According to a third aspect of the present invention, an additional operation value in +Y or −Y direction can be inputted by the input device before a predetermined period of time has elapsed following the provision of the ball striking operation value given at the time of hitting the ball by the player, based on the second aspect of the present invention.

According to a forth aspect of the present invention, when an additional operation value in +Y direction is inputted, rotation corresponding to the additional operation value in +Y direction is provided for the golf ball at the position where the golf ball has landed; and when an additional operation value in −Y direction is inputted, rotation corresponding to the additional operation value in −Y direction is provided for the golf ball at the position where the golf ball has landed, based on the third aspect of the present invention.

According to a fifth aspect of the invention, the flight mode includes either a slice, during which the golf ball curves to the right in flight, or a hook, during which the golf ball curves to the left in flight, based on the first aspect of the present invention.

According to a sixth aspect of the invention, a program for controlling execution of a golf simulation game using an information processing apparatus, includes the steps of:

during the golf simulation game, by an image processing circuit performing perspective transformation of a golf course in a virtual three-dimensional space into a two-dimensional projection for which the origin is the viewpoint of a camera located in the virtual three-dimensional space;

by a monitor displaying an image in the two-dimensional projection obtained by the perspective transformation;

by a controller moving the viewpoint of the camera along a height, or along a forward direction in the virtual three-dimensional space, based on a camera movement controlling signal inputted by a player using an input device; and having the controlling device rotatably adjust the direction of view of the camera at a position to which the viewpoint is moved.

According to a seventh aspect of the invention, a program for setting a viewpoint and an object in a virtual three-dimensional space and for generating an image of the object taken from the viewpoint includes the steps of:

By a controller detecting a first operating signal inputted by first operation device;

By the controller continuously changing the position of the viewpoint while the first operating signal is detected; and when a second operating signal inputted by second operation device is detected, by the controller fixing the position of the viewpoint, and continuously changing the direction of view in accordance with an operation value based on the second operating signal.

According to an eighth aspect of the invention, a program for setting a viewpoint and an object in a virtual three-dimensional space and for generating an image of the object taken from the viewpoint, comprises the steps of:

By a controller detecting a first operating signal inputted by first operation device;

By the controller continuously changing the position of the viewpoint while the first operating signal is detected; and when a second operating signal inputted by a second operation device is detected, by the controlling device fixing the position of the view point, and in accordance with an operation value based on the second operating signal, continuously changing the position of the viewpoint while fixing the viewed point so as to maintain an almost constant distance between the viewpoint and the viewed point.

According to a ninth aspect of the present invention, a program for controlling execution of a ball sports simulation game using an information processing apparatus, includes the steps of:

by an image processor displaying a ground and a cup which is formed in the ground for accepting a ball coursing over the ground from a distance; and by the image processing device displaying the height of the ground by pasting a texture that varies in darkness to the displayed ground.

According to a tenth aspect of the invention, the ball sports simulation game is a golf simulation game, and the ball is a golf ball; and the ground is a green topographic entity, and positional difference in height between the cup for accepting a golf ball and the golf ball is apparent near the cup, based on the ninth aspect of the present invention.

According to an eleventh aspect of the present invention, an information processing apparatus includes:

a storage device for storing a program for controlling execution of a golf simulation game;

an input device for setting a ball striking strength and a ball operating angle for a golf ball hit by a player as well as a ball striking operation value and a ball striking angle for the golf ball at the time of hitting the golf ball; and a controller for detecting the ball striking operation value and the ball striking angle for the golf ball set by the player using an input device at the time of hitting the golf ball, performing a correction of a specific distance in accordance with the ball striking operation value at the time of hitting the golf ball, to a traveling distance of the golf ball corresponding to the detected ball striking strength, and determining a flight mode of the golf ball based on the ball operating angle and the ball striking angle at the time of hitting the golf ball, which are set by the player using the input device, in accordance with a program stored in the storage device.

According to a twelfth aspect of the present invention, a track ball is provided for the input device, and is used for entering, as analog values, the ball striking strength and the ball operating angle of the golf ball, as well as the ball striking operation value and the ball striking angle at the time of hitting the ball, based on the eleventh aspect of the present invention.

According to a thirteenth aspect of the present invention, a program comprises the steps of:

enabling a player to input a timing for hitting a ball that is displayed on a display monitor by using input device;

by an image processor displaying cursors on the display monitor;

enabling the player to select a cursor having a specific pattern area by using the input device, and by the processor changing and displaying the shape of the cursor displayed on the display monitor in accordance with the selected specific pattern; and by a controller determining whether the position of the ball displayed on the display monitor is within an area of the displayed cursor after shape changing, the position being at the time when a specific time has been elapsed after the time of hitting at the ball inputted by the player using the input device.

According to a fourteenth aspect of the present invention, a program for controlling execution of a baseball simulation game using an information processing apparatus in which a hitting timing for a batter character operated by a first player to hit a ball thrown by a pitcher character displayed on a display monitor is controlled, includes the steps of:

By a controller setting a pitch type thrown by the pitcher character displayed by means of an operation by a second player using an input device or by the control of a program;

enabling the first player to set a timing and a position for the displayed batter character to use the input device in order to hit a ball thrown by the pitcher character; and furthermore, enabling the first player to use the input device in order to predict the pitch type of the thrown ball and to select a cursor shape pattern in which hitting by the batter character is regarded as valid when the ball is within an area.

According to a fifteenth aspect of the present invention, a program for performing, using a game apparatus displaying an image captured from a specific viewpoint in a virtual space on display device, judgment whether a first character placed in the virtual space that is operated by a first player, contacts a second character moving in the virtual space, and for controlling progress of a game in accordance with the result of the judgment, including the steps of:

by the display device displaying a cursor indicating an area in which contact of the first character and the second character is regarded as valid;

by an input device inputting an operating signal corresponding to at least one parameter predicted by the first player among a plurality of parameters for specifying movement of the second character;

by a controller setting at least one parameter among a plurality of parameters for specifying movement of the second character so that it cannot be recognized before the operating signal corresponding to the prediction is inputted, and move the second character in accordance with the set parameter;

by the controller judging whether the prediction made by the first player is right or wrong, based on the inputted operating signal and the parameter set to the second character; and when the prediction is right, making at least the shape or the size of the cursor into a shape or a size corresponding to the prediction made by the first player.

According to a sixteenth aspect of the present invention, setting by controlling device of the at least one parameter of the plural number of parameters for specifying the movement of the second character is based on an operating signal inputted by a second player using the input device who is playing a game against the first player, based on the fifteenth aspect of the present invention.

According to a seventeenth aspect of the present invention, the position of the displayed cursor is made to move to be set in accordance with the operating signal inputted by the first player using the controller, based on the fifteenth aspect of the present invention.

According to an eighteenth aspect of the present invention, setting for the movement of the position of the displayed cursor by the controlling device based on the operating signal inputted by the first player includes the steps of:

By the display device displaying a plural number of cursors that have been set previously;

enabling the first player to select one cursor out of the displayed plural number of cursors by using the input device;

by the controlling device making the selected cursor to be an object of contact judgment with the second character, based on the seventeenth aspect of the present invention.

According to a nineteenth aspect of the present invention, a program for controlling execution of a baseball game wherein a ball thrown by a pitcher character displayed by display device is hit at by a batter character operated by a player and displayed by the display device, and the progress of the baseball game is controlled by the validity of the hitting, includes the steps of:

By the display device displaying a cursor indicating an area in which the hitting is regarded as valid;

enabling the player to predict the pitch type of the thrown ball, and by the input device inputting an operating signal corresponding to the prediction;

by the controller setting the pitch type of the thrown ball so that the pitch type cannot be recognized by the player before the input device inputs it;

by an image processing device moving a cursor displayed by the display device, based on an operating signal inputted by the player using the input device;

by the image processing device moving the displayed ball so that the movement corresponds to the set pitch type;

by the controller determining whether the diction made by the player is right or wrong, based on the operating signal for predicting the pitch type and the pitch type of the thrown ball; and when the prediction by the player is judged to be right, making at least the shape or the size of the displayed cursor into a shape or a size corresponding to the prediction made by the player.

According to a twentieth aspect of the present invention, a program for controlling execution of a football game wherein a ball kicked by a kicker character displayed by display device is caught at by a goalkeeper character operated by a player and displayed by the display device, and the progress of the football game is controlled by the validity of the catching, including the steps of:

By the display device displaying a cursor indicating an area in which the catching is regarded as valid;

enabling the player to predict the ball movement type of the ball kicked by the kicker character, and by the input device inputting an operating signal corresponding to the prediction;

by the controller setting the ball movement type of the kicked ball so that the ball movement type cannot be recognized by the player before inputting by the input device;

by an image processing device moving a cursor displayed by the display device, based on an operating signal inputted by the player using the input device;

by the image processing device moving the displayed ball so that the movement corresponds to the set ball movement type;

by the controller determining whether the prediction made by the player is right or wrong, based on the operating signal for predicting the ball movement type, and the ball movement type of the kicked ball; and when the prediction by the player is judged to be right, making at least the shape or the size of the cursor into a shape or a size corresponding to the prediction.

According to a twenty-first aspect of the present invention, a program for performing, using a game apparatus displaying an image captured by a specific viewpoint in a virtual space on display device, judgment whether a first character placed in the virtual space that is operated by a first player, contacts a second character moving in the virtual space based on the operation of a second player, and for controlling progress of a matching game in accordance with the result of the judgment, including the steps of:

by the display device displaying a cursor indicating an area in which contact of the first character and the second character is regarded as valid;

enabling the first player to predict the parameter set to the second character;

by the input device inputting an operating signal corresponding to the prediction;

enabling the second player to set the at least one parameter among a plurality of parameters for specifying movement of the second character so that the movement cannot be recognized by the first player before inputting by the input device;

by the controller moving the second character in accordance with the set parameter;

by the controller judging whether the prediction made by the first player is right or wrong, based on the inputted operating signal and the parameter set to the second character; and when the prediction is judged to be right, making at least the shape or the size of the cursor into a shape or a size corresponding to the prediction made by the first player.

Further features of the present invention will become apparent during the course of the subsequent embodiment explanation, given while referring to the accompanying drawings.

DETAILED DESCRIPTION OF THE PREFERRED EMBODIMENT

Figure 1:
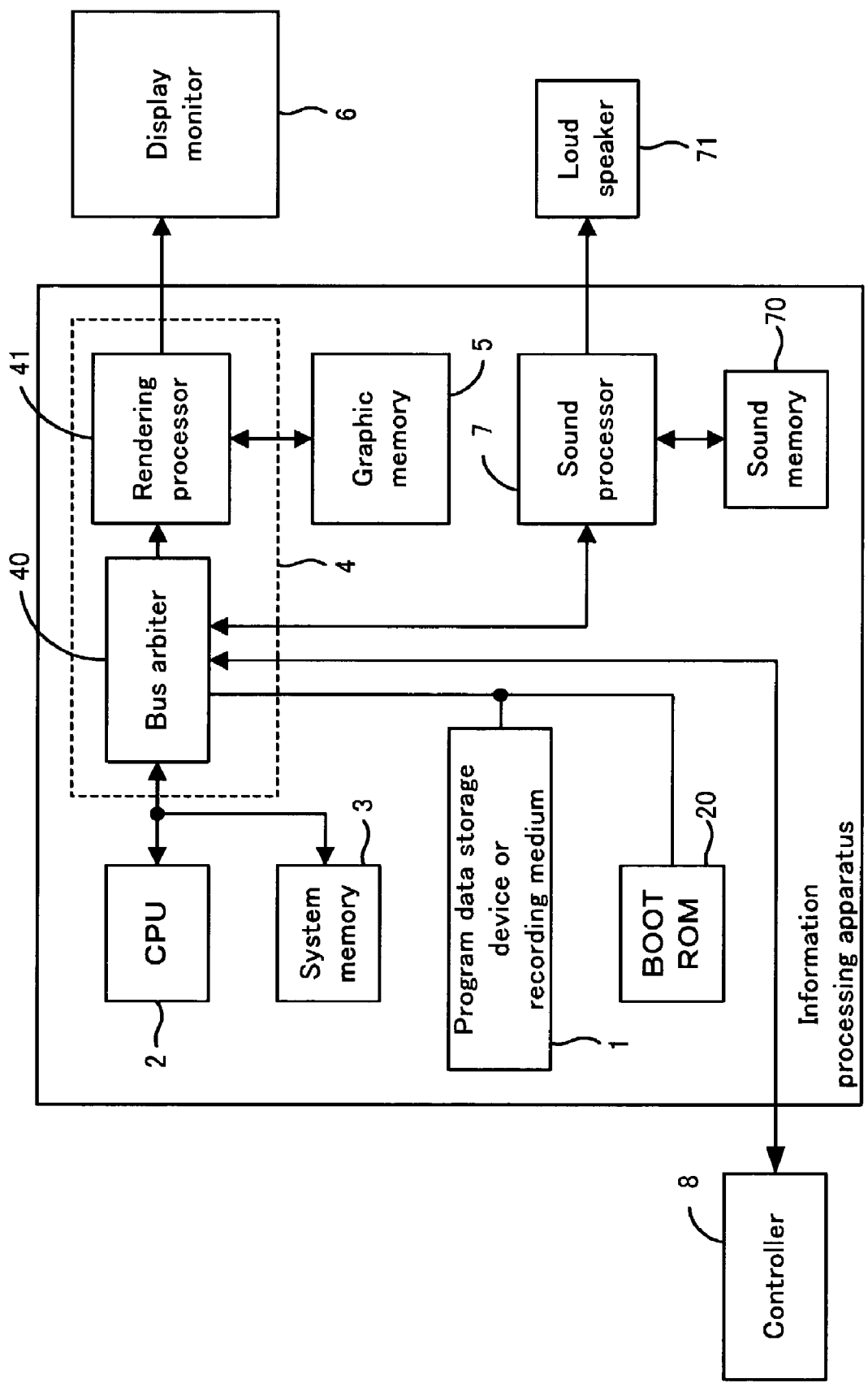
FIG. 1 is a block diagram showing an example configuration for an information processing apparatus according to the present invention.

FIG. 1 is a block diagram showing an example configuration of an information processing apparatus according to the present invention. In FIG. 1, the information processing apparatus includes a program data storage device or recording medium (including an optical disk and an optical disk drive) 1 in which a program according to the present invention and data accompanying the program for executing the program are stored.

Further, in the information processing apparatus, a CPU 2 performs, as controlling device, controlling of the entire system, calculation of coordinates for an image display, etc. in the course of execution of the program.

A program according to the present invention and data accompanying the program required for the processing performed by the CPU 2 are read out from the program data storage device or recording medium 1, and temporarily stored in a system memory 3. An initiation program required for activating the information processing apparatus is stored in a boot ROM 20.

In addition, a bus arbiter 40 controls the transmission of program data among the individual blocks of the information processing apparatus and with externally connected machines. A rendering processor 41 either reproduces movie data read from the program data storage device or recording medium 1, or generates images for an image display in accordance with player instructions or in consonance with the progress of a game.

Graphics data or other similar data required for the generation of images by the rendering processor 41 are stored in a graphic memory 5. A sound processor 7 reproduces music data read from the program data storage device or recording medium 1, or generates sound effects and verbal expressions in accordance with player instructions or in consonance with the progression of a game. Sound data or other similar data required for the generation of the sound effects and verbal expressions are stored in a sound memory 70.

The bus arbiter 40 is connected to a controller 8 containing a digital input button key, a joystick, or analog input device such as a track ball for outputting information for controlling the function-constituting parts of the information processing apparatus or externally connected machines. Digital and analog signals are inputted in accordance with the operation information by a player using the controller 8.

The information processing apparatus employs operating instructions from a player entered using the controller 8 as parameters when a program according to the present invention stored in the system memory 3 controls the CPU 2 as controlling device. And the rendering processor 41 and the sound processor 7 perform image or voice processing, in accordance with instructions received from the operator, and respectively output images and sound to the display monitor 6 and a loudspeaker 71 as display device.

To apply the present invention, the information processing apparatus may also be a television game machine, a personal computer, a workstation, a telephone set or a communication apparatus having an image display function, or it may be an image display apparatus having a communication function or an information processing function.

Assuming that a program according to the present invention executed by the information processing apparatus is a game program for controlling execution of a sports simulation game such as a golf or baseball simulation game, this program includes program data for controlling execution of a sports simulation game such as a golf or baseball simulation game, and image data for displaying characters such as portraits of golfers, pitchers and batters, and backgrounds.

Hereupon, a displayed character image is composed of a plurality of polygons having coordinates in the virtual three-dimensional space as vertex data. Accordingly, a displayed character image data device vertex data of a plurality of polygons constituting a character.

The bus arbiter 40 and the rendering processor 41 as described above can be consolidated as a DSP (Digital Signal Processor) 4, which has a coordinate transformation function for a displayed image data having three-dimensional coordinates, and a function as image processing device for pasting texture data into a polygon which forms the displayed character image, in accordance with the program data to control execution of the game.

The above-described coordinate transformation function transforms displayed image data having global coordinates into three-dimensional viewpoint coordinates, and then performs perspective transformation of the three-dimensional coordinates into two-dimensional coordinates. The displayed image data to which texture data is pasted in the three-dimensional viewpoint coordinates, and which is then subjected to perspective transformation into the two-dimensional coordinates, is transmitted to the graphic memory 5. Thereafter the displayed image data is sequentially read out and converted into a video signal, which is then displayed as an image on the monitor 6.

Further, based on the program data for controlling the game execution, in synchronism with the image display, a digital voice signal is processed by the sound processor 7. The resultant signal is converted into an analog voice signal, which is then released as sound by the loudspeaker 71.

An explanation will now be given for the control process of the program according to the present invention, by employing, as a game program for executing a sports simulation game, the above-described program stored in the program data storage device or recording medium 1 of the information processing apparatus.

Figure 2:
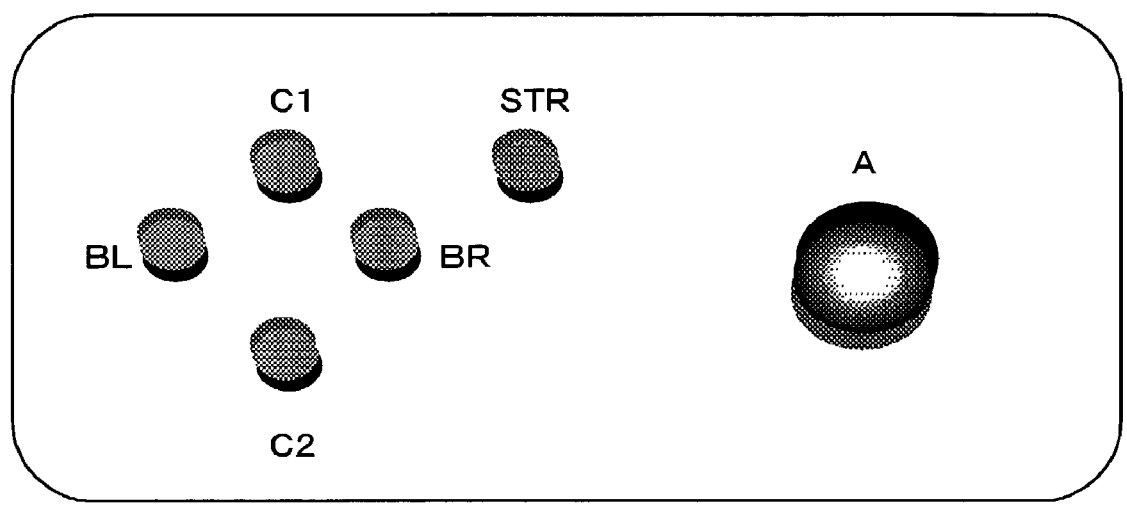
FIG. 2 is a diagram showing an example controller 8 provided for a control panel belonging to an information processing apparatus for controlling execution of a golf simulation game program.

FIG. 2 is a diagram showing an example controller 8 provided for a control panel (not shown) belonging to an information processing apparatus shown in FIG. 1 which executes a golf simulation game program.

The controller 8 includes a track ball A, a start button STR, driving direction adjustment buttons BR and BL and camera position moving buttons C1 and C2.

Figure 3:
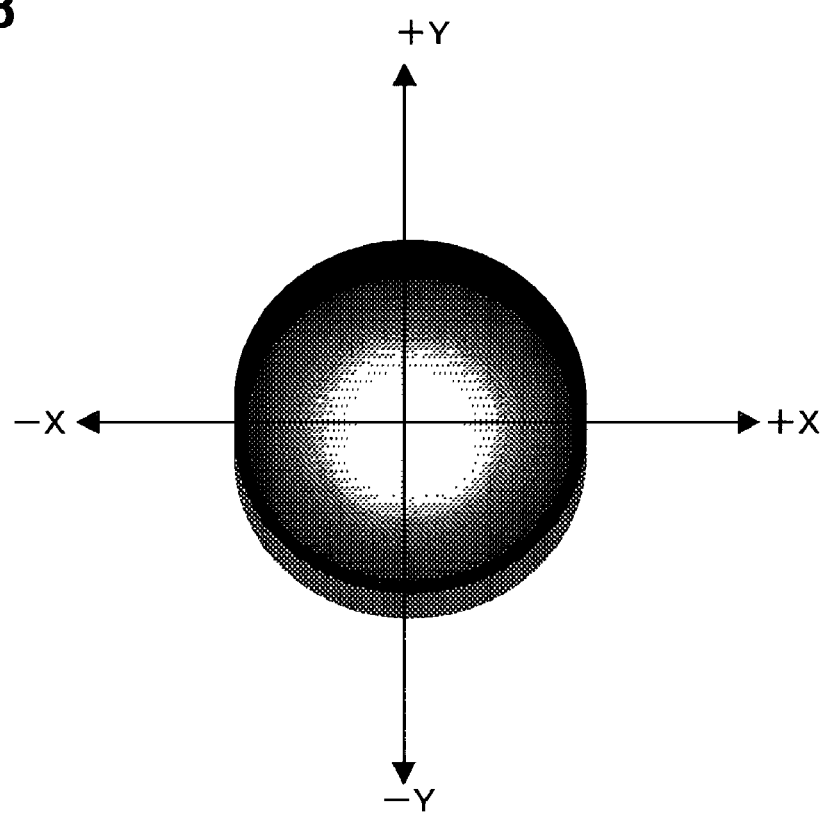
FIG. 3 is a diagram for explaining a track ball A.
Figure 4:
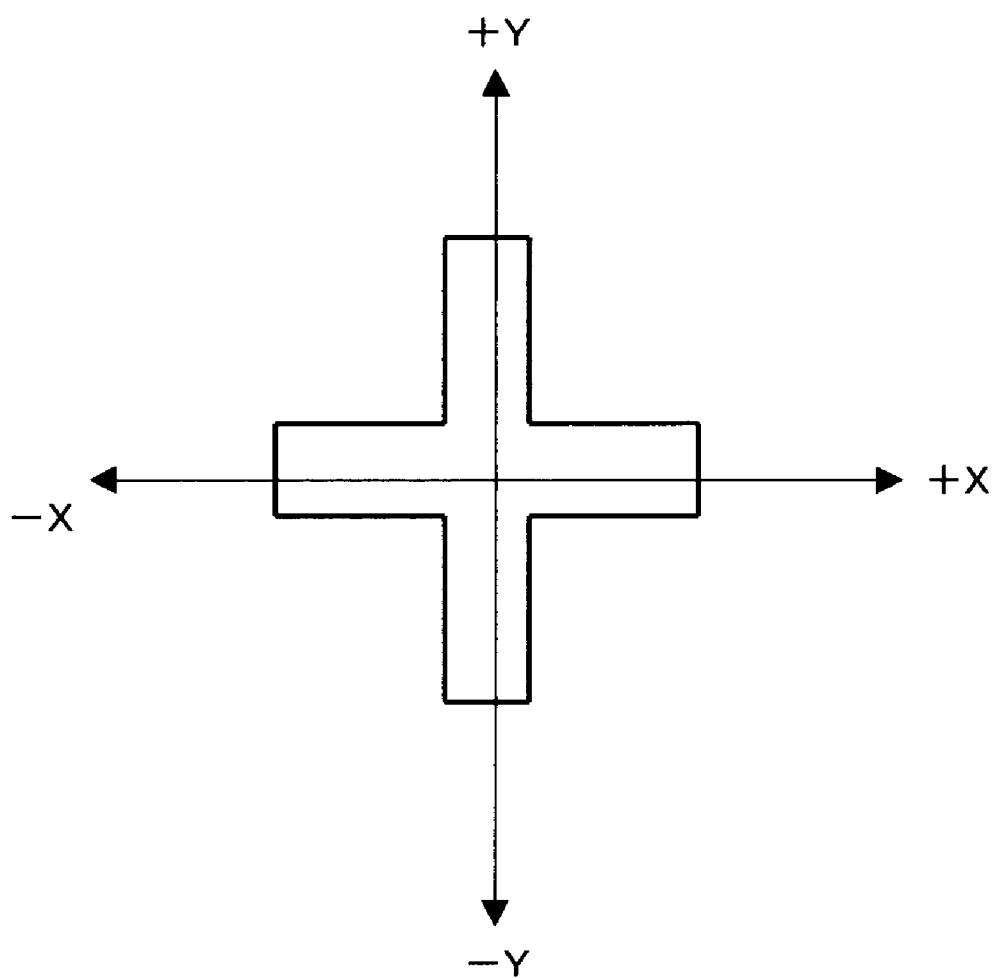
FIG. 4 is a diagram for explaining a case wherein a cross-shaped key is employed instead of the track ball A.

As is shown in FIG. 3, the track ball A is a spherically shaped, and has a known mechanism that as it is rotated, an analog signal in a amount of ±X or ±Y along either the X or the Y axis is entered, corresponding to the direction and amount of the rotation. A known cross-shaped key shown in FIG. 4 may be employed instead of the track ball A, and an analog signal in an amount of ±X or ±Y value along either the X or the Y axis may be entered corresponding to the depressed direction and the time duration of the key depression.

The start button STR is a button key for resetting the entries. Upon depression of the start button STR, input values are canceled and re-entry is made possible.

The driving direction adjustment buttons BR and BL are button keys for adjusting, on a golf course displayed by the player on the monitor 6, the relationship between the direction of a character image corresponding to a golf player operated by a player and the direction of the golf course, and adjusting, to the right or to the left, the direction in which a golf ball is hit (driven).

A camera viewpoint is positioned along the golf course shown in a virtual three-dimensional space, and an image projected onto a two-dimensional plane by using the camera viewpoint as the origin is displayed on the monitor 6. Therefore, when the camera viewpoint is moved, the image of the golf course projected onto the two-dimensional plane is also changed.

While the camera position moving button C1 is depressed, the camera viewpoint is moved upward a predetermined distance. By the upward movement of the camera viewpoint, it is possible to have a bird-eye view of the course. When the camera position moving button C1 is released from depression, the camera viewpoint is returned to the previous position.

Also, when the camera position moving button C2 is depressed, the camera viewpoint is moved upward a predetermined distance. By the upward movement of the camera viewpoint, the course can be checked in the manner of a bird's-eye view. When the camera position moving button C2 is released from depression, the camera viewpoint is returned to the previous position.

Further, when the track ball A is rotated while the camera position moving button C1 or C2 is depressed, the camera position is fixed, and the camera viewpoint is controlled to rotate at an angle equivalent to the track ball rotation amount.

As described above, coordinate transformation is performed at DSP (digital signal processor) 4 corresponding to the movement and the rotation of the camera viewpoint, based on a signal inputted by controller 8 through operation of the camera position moving buttons C1 and C2. Accordingly, changes can be given to a displayed image corresponding to movement and rotation of the camera viewpoint.

Or, when the camera viewpoint position is controlled to continuously change, while fixing a viewed point so that the distance between the camera viewpoint and a hole on a green 101 as the viewed point, is kept roughly constant, it is possible to observe the surroundings of the green 101 from the front direction.

By controlling the program as described above, a player can check the layout of a golf course before driving a ball.

Accordinly, execution of a golf game is controlled by the program, corresponding to the operations of a player using controller 8.

Figure 5:
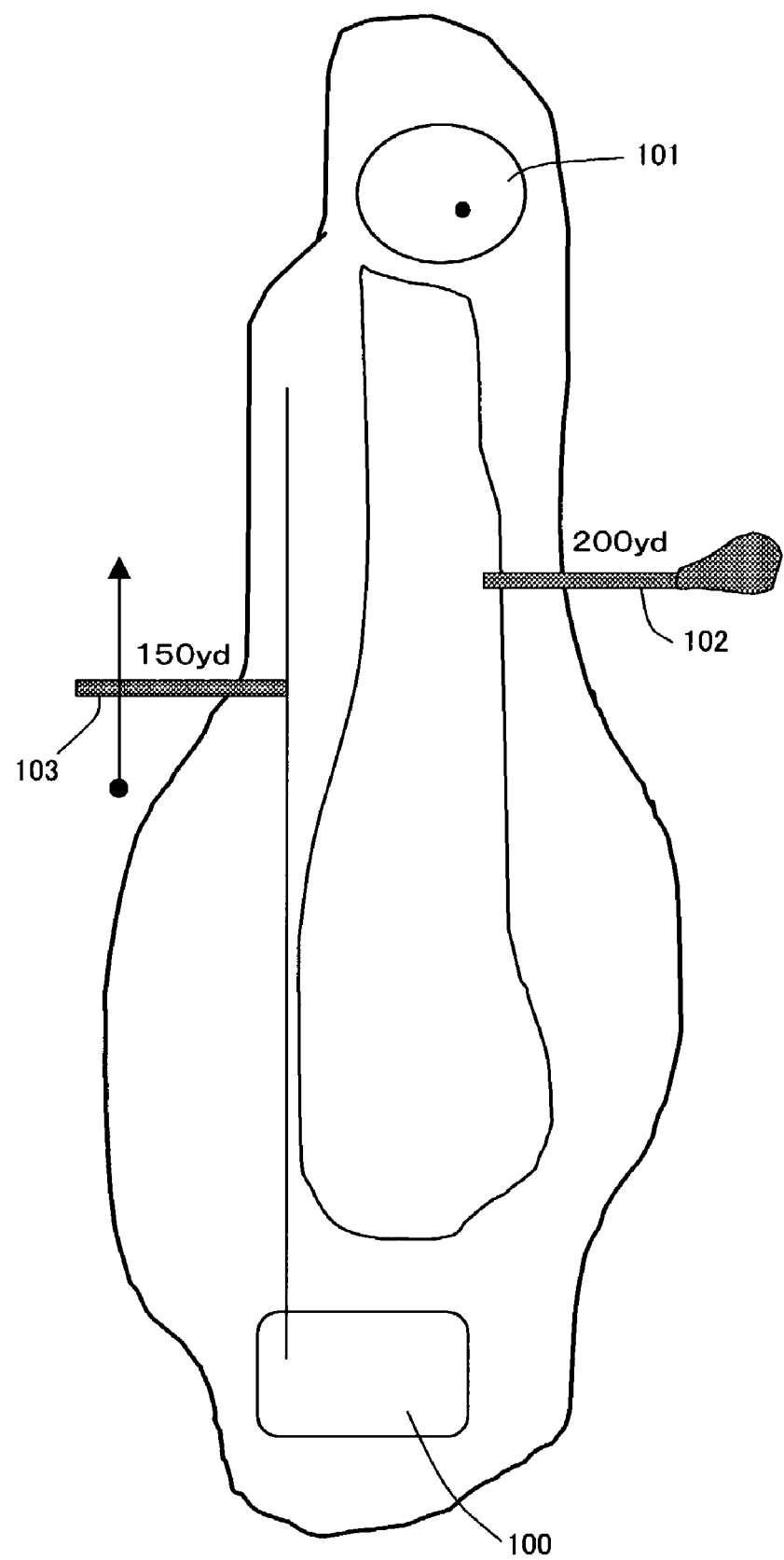
FIG. 5 is a diagram showing an example golf course displayed on a display monitor 6.

FIG. 5 is a diagram showing an example golf course layout displayed on the monitor 6. In FIG. 5, a teeing ground 100 and a green 101 are shown. During the game, a player selects an appropriate golf club for a displayed course, and in FIG. 5, a golf club 102 selected by the player is displayed. In addition, the driving range capacity (200 yards) for this club 102 is also displayed.

In this embodiment, the track ball A can be employed to select and enter a golf club. That is, according to the program, it is possible to display ±X input value corresponding to the type of golf club, the input being given by the rotation of the track ball A in +X or −X direction.

Then, the player performs driving the ball using the displayed golf club. As the player performs driving the ball, CPU 2 uses the program to compute conditions and set the flight direction (the flight mode such as a slice and a hook) and the traveling distance for the ball.

Figure 6:
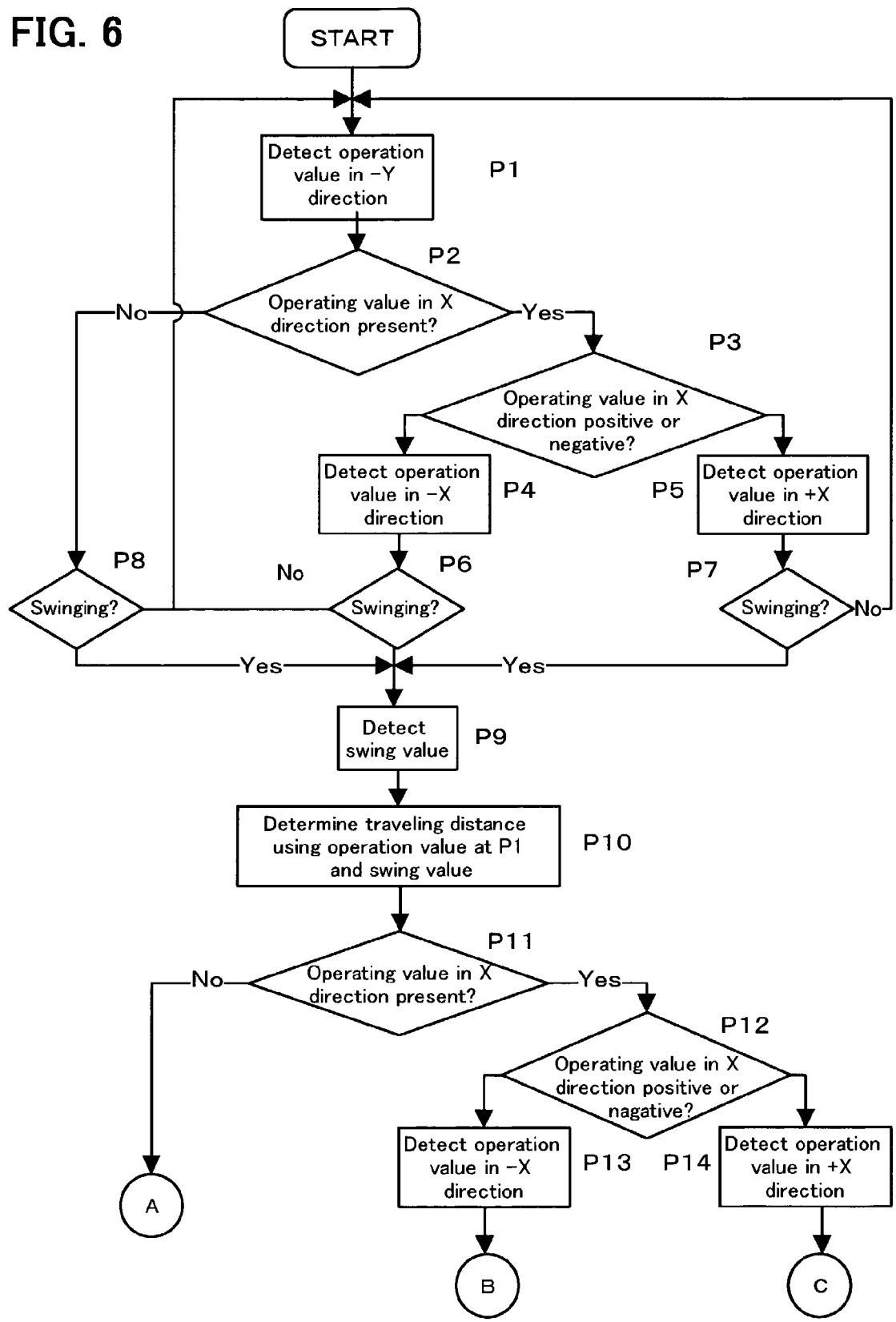
FIG. 6 is a flowchart (1) for the processing performed by a program for setting a flight direction and a traveling distance of a ball.
Figure 7:
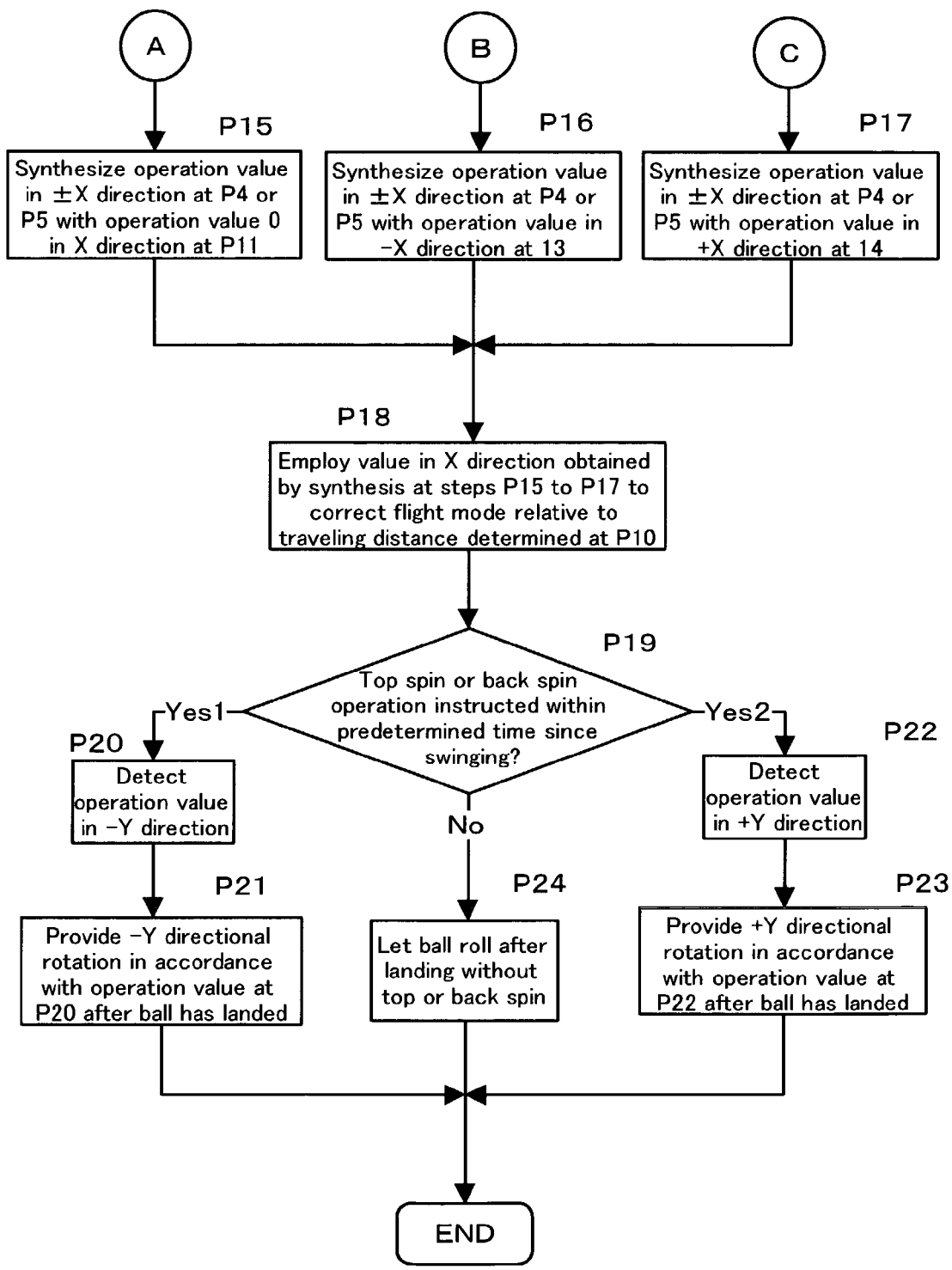
FIG. 7 is a flowchart (2) for the processing performed by a program for setting a flight direction-and a traveling distance of a ball.

FIGS. 6 and 7 are flowcharts for the processing at CPU 2 performed by the program for setting the ball flight direction and the traveling distance.

In FIG. 6, first, an operation value in −Y direction as an example of the above-described ball striking strength, is detected(step P1). The operation value in −Y direction is the distance the player rotates the track ball A in −Y direction. In FIG. 5, a target traveling distance (in FIG. 5, 150 yards) is displayed in accordance with the operation value in −Y direction, which is designated by the player relative to the driving range capacity of the selected and displayed club 102.

In order to obtain a traveling distance corresponding to the driving range capacity of the selected club 102, the track ball A is rotated to be set in −Y direction, so that the position of the target traveling distance indicator 103 corresponds to the position of the selected club 102 on the display.

Following this, in FIG. 6, a check is performed to determine whether an operation value in the X direction is present when the track ball A is manipulated in −Y direction (step P2). For this process, the operation value in the X direction is generated when, in order to set the target traveling distance, the track ball A in FIG. 3 is rotated in such a way that a +X or −X directional element perpendicular to the Y axis is included together with −Y direction movement.

FIGS. 8A to 8I are diagrams for explaining the rotation of the track ball A in −Y direction, the operation value of the track ball A in the X direction and the ball driving direction which will be described later. It is to be noted that an oval in the middle of each of FIGS. 8A to 8I represents a track ball.

In FIGS. 8A to 8I, arrows 200 and 300 represent rotation in −Y direction and in +Y direction, respectively. An arrow 201 indicates rotation as synthesized from a −Y direction component and a +X direction component. An arrow 202 indicates rotation as synthesized from a −Y direction component and a −X direction component. An arrow 301 indicates rotation as synthesized from a +Y direction component and a +X direction component. An arrow 302 indicates rotation as synthesized from a +Y direction component and a −X direction component.

In FIG. 8A is shown an example wherein the operation value of the track ball A in the X direction is zero (200) when the track ball A is rotated in −Y direction. In FIG. 8B is shown an example wherein the operation value of the track ball A in +X direction is provided (201) when it is rotated in −Y direction. In FIG. 8F is shown an example wherein the operation value of the track ball A in −X direction is provided (202) when it is rotated in −Y direction.

In FIG. 6, when it is determined at step P2 that the operation value in the X direction is present (Yes at step P2), a check is performed to determine whether the operation value in the X direction is negative or positive (step P3), and the operation value in each direction is detected (step P4 or P5).

Then, when the track ball A is rotated in +Y direction, that is an action to determine the above-described ball striking operation value, CPU 2 uses the program to determine that a swing has been made (Yes at step P6 or P7). When it is determined at step P2 that the operation value in the X direction is not present (No at step P2), a check is performed to determine whether a swing was made without the operation value in the X direction being detected (step P8).

When the swing was made (Yes at step P6, P7 or P8), the swing value, i.e., the operation value in +Y direction is detected (step P9). Then, CPU 2 calculates the traveling distance in accordance with the detected swing value and the operation value in −Y direction that has been detected at step P1 (step P10).

Figure 9:
FIG. 9 is a diagram for explaining the process performed when a traveling distance is determined by adjusting a distance at a target traveling distance indicator 103.

This traveling distance is determined in the following manner. As is shown in FIG. 5, the target traveling distance indicator 103 is designated by the operation value in −Y-direction. Then, in accordance with the swing value detected at step P9, an adjustment is made to determine the traveling distance so that the distance is within a 5% range for the target traveling distance indicator 103, as is shown as an example in FIG. 9.

Further, in FIG. 6, a check is performed to determine whether an operation value in the X direction is present at the time of the swing (step P11). When the operation value in the X direction is present, a check is performed to determine whether the operation value is in −X direction or in +X direction (step P12), and the operation value in the relevant direction is obtained (step P13 or P14).

Figure 8:
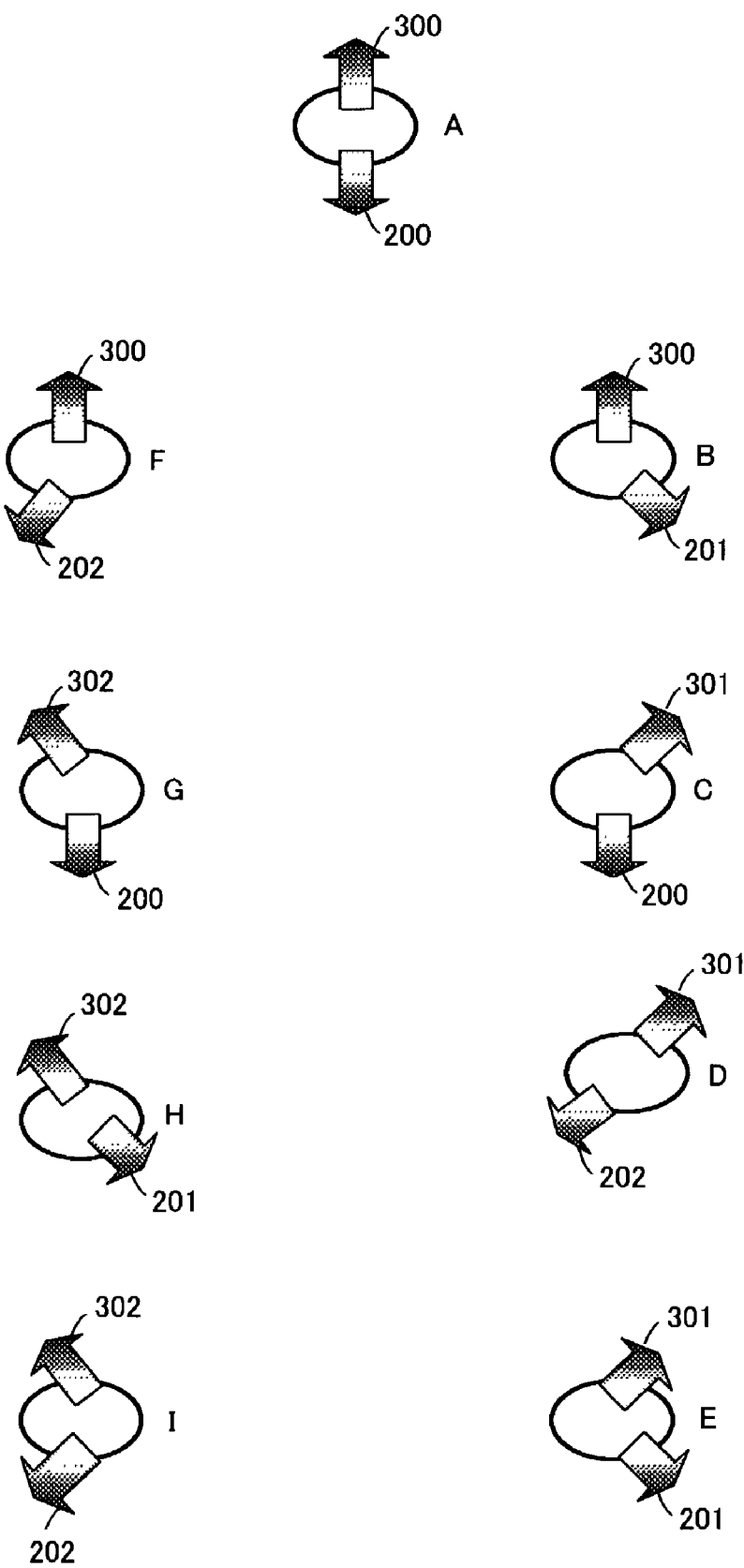
FIG. 8 is a group of diagrams for explaining rotation of the track ball A in –Y direction, operation values of the track ball A in X direction, and directions in which the ball is driven, which will be described later.

At this time, when as is shown in FIG. 8 the swing is made in a direction 301 or in a direction 302 relative to an upright direction 300, an operation value in either +X direction or in −X direction is generated.

Furthermore, in FIG. 7, the operation value in −X or +X direction detected at step P4 or P5 is synthesized with the operation value 0 in the X direction determined at step P11 (step P15). This state corresponds to those in FIGS. 8A, 8B and 8F.

Also, the operation value in −X or +X direction detected at step P4 or P5 is synthesized with the operation value in −X direction detected at step P13 (step P16). This state corresponds to those in FIGS. 8G, 8H and 8I.

In addition, the operation value in −X or +X direction detected at P4 or P5 is synthesized with the operation value in +X direction detected at step P14 (step P17). This state corresponds to those in FIGS. 8C, 8D and 8E.

Then, the synthesized value in the X direction thus obtained by the synthesis at step P15, P16 or P17 is employed to correct the flight mode relative to the traveling distance determined at step P10 (step P18).

Specifically, among the examples in FIGS. 8A to 8I, the flight mode in FIG. 8G is for a hook (left curve), the flight mode in FIG. 8D is for a drive to the right, and the flight mode in FIG. 8C is for a slice (right curve).

Further, in FIG. 7, a check is performed to determine whether an operation for a back spin or a top spin has been instructed within a predetermined time following the swing (step P19). A back spin operation is performed by additionally rotating the track ball A in FIG. 3 in −Y direction (Yes1 at step P19), while a top spin operation is performed by additionally rotating the track ball A in +Y direction (Yesl2 at step P19).

Figure 10:
FIG. 10 is a diagram for explaining the process performed for a backspin operation.

When the back spin operation is instructed (Yes1 at step P19), the back spin operation value is detected (step P20). Then, rotation in −Y direction is provided for the ball after the ball has landed in accordance with the operation value detected at step P20, and as is shown in FIG. 10, the back spin operation is performed (step P21).

Figure 11:
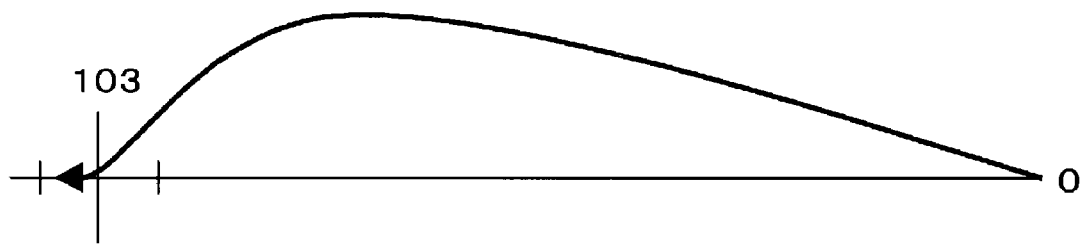
FIG. 11 is a diagram for explaining the process performed for a top spin operation.

When the top spin operation is instructed (Yes2 at step P19), the top spin operation value is detected (step P22). Rotation in +Y direction is provided for the ball after it has landed in accordance with the operation value detected at step P22, and as is shown in FIG. 11, the top spin operation is performed (step P23).

The present invention has a feature for displaying an image of a green during the golf game. It is, important, when golf is actually being played, for the slope of a green relative to the cup to be determined before putting.

Figure 12:
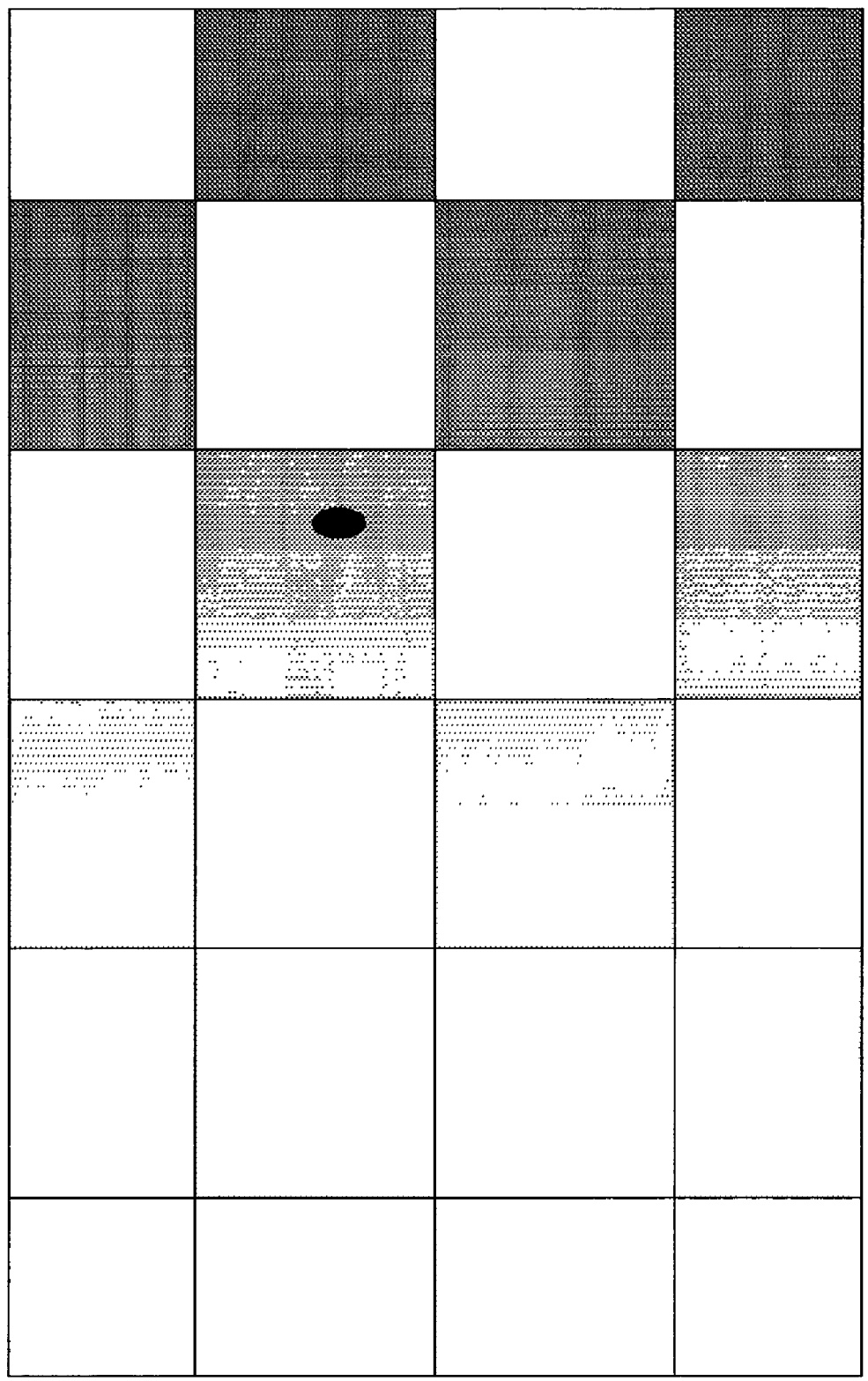
FIG. 12 is a diagram showing an example image of a golfing green according to the present invention.
Figure 13:
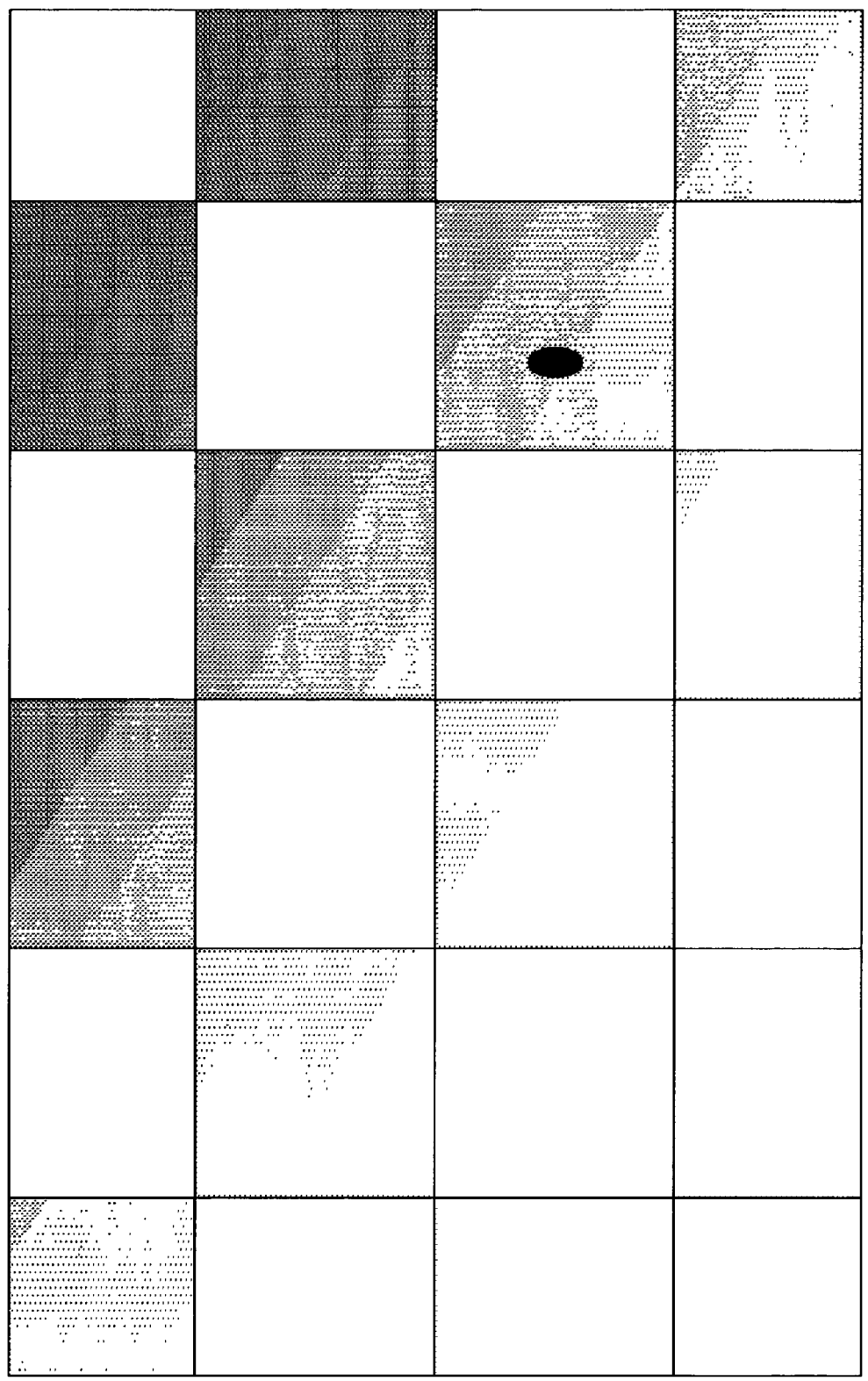
FIG. 13 is a diagram showing another example image of a golfing green according to the present invention.

FIGS. 12 and 13 are diagrams showing example images of greens according to the present invention. The black circle represents a cup, and height differences are represented by the densities of the colors shown on the screen. In FIG. 12, wherein a darker area represents a lower elevation, the image color density, or the darkness, increases from the bottom to the top. Therefore, it is evident from the example in FIG. 12 that the green inclines downward, toward the cup.

In the example in FIG. 13, it is evident that the green inclines downward diagonally toward the upper portion. Thus, since the program can alter the speed of a ball for putts made with the same strength in consonance with the degree of inclination of a green, a player may experience through the game a virtual putting sensation by determining, before putting, the degree of inclination represented by the color densities shown on the screen.

Although not shown in FIGS. 12 and 13, for the height difference between the position of the ball and the position of the cup (the black circle in FIGS. 12 and 13) on the green, a numerical value is displayed near the cup as reference data for a player. The player, therefore, can correctly apprehend the inclination of the green and can estimate an appropriate strength to be used for putting.

An example for which a baseball simulation game is employed will now be given to illustrate how the objective of the present invention is achieved, by providing a game program for controlling execution of a game and an information processing apparatus therefor which affords a player sensations similar to those experienced while engaging in actual sports.

According to the present invention, execution of a baseball simulation game is controlled so that, while a player operates a batter character in a baseball game displayed on a display monitor, he can predict the selection of the type of pitch thrown by a pitcher character displayed and controlled by a counterpart player or by an information processing apparatus in accordance with the program. An arrangement that ensures more realistic circumstances will be provided.

Figure 14:
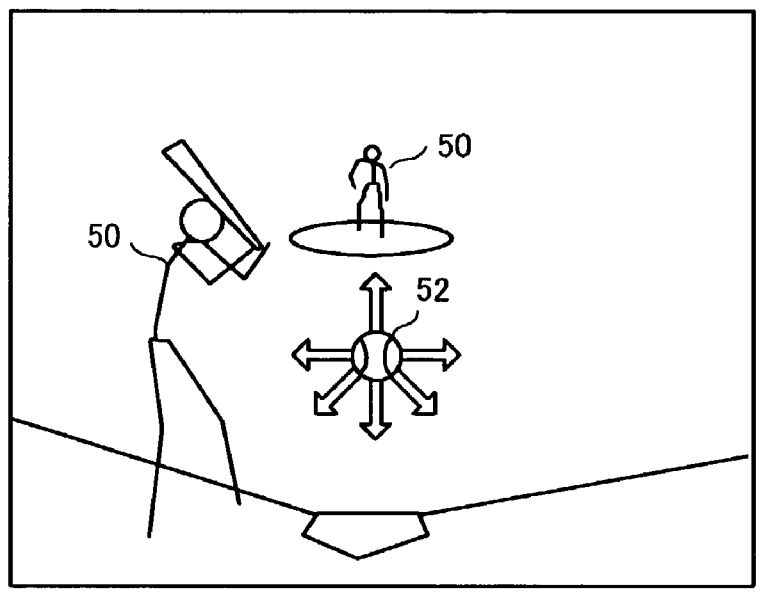
FIG. 14 is a diagram showing an example image displayed on a display monitor 6 for a baseball simulation game according to the present invention.

FIG. 14 is a diagram showing an example image for the baseball game displayed on the monitor 6 according to the present invention. A pitcher character 50 and a batter character 51 are displayed. Together with a character display of a ball 52, the directions of flight of the ball 52, i.e., arrows indicating the pitch types, are displayed.

Figure 15:
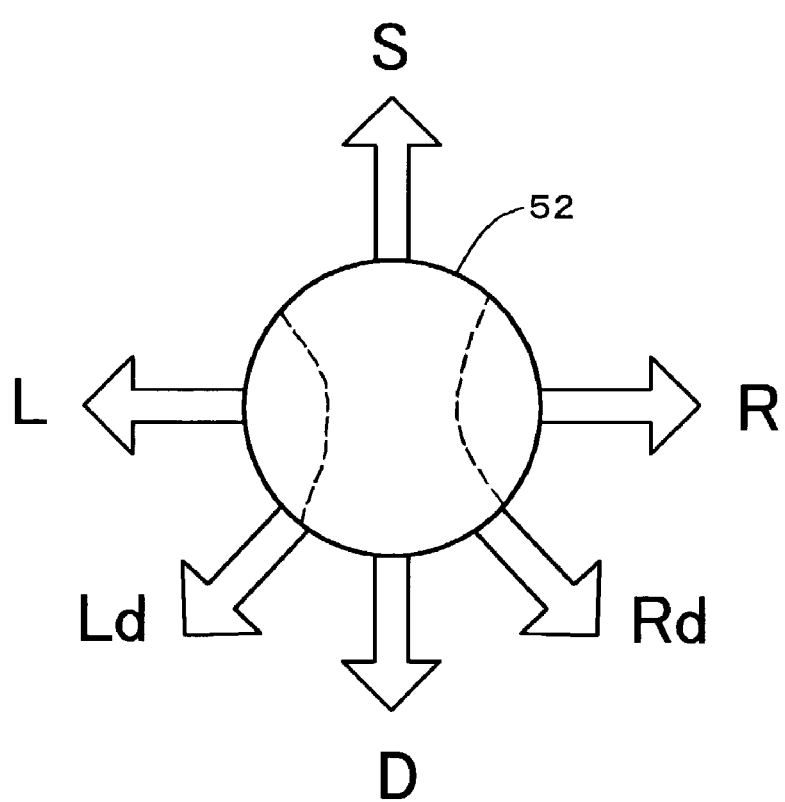
FIG. 15 is an enlarged diagram showing a ball 52 and arrows representing types of pitches.

FIG. 15 is an enlarged diagram showing the ball 52 and the arrows used to indicate the pitch types. For the pitch types, arrow S represents a straight ball, R represents a right curve, L represents a left curve, D represents a fork (a drop) ball, Rd represents a right slider, and Ld represents a left slider.

Figure 16:
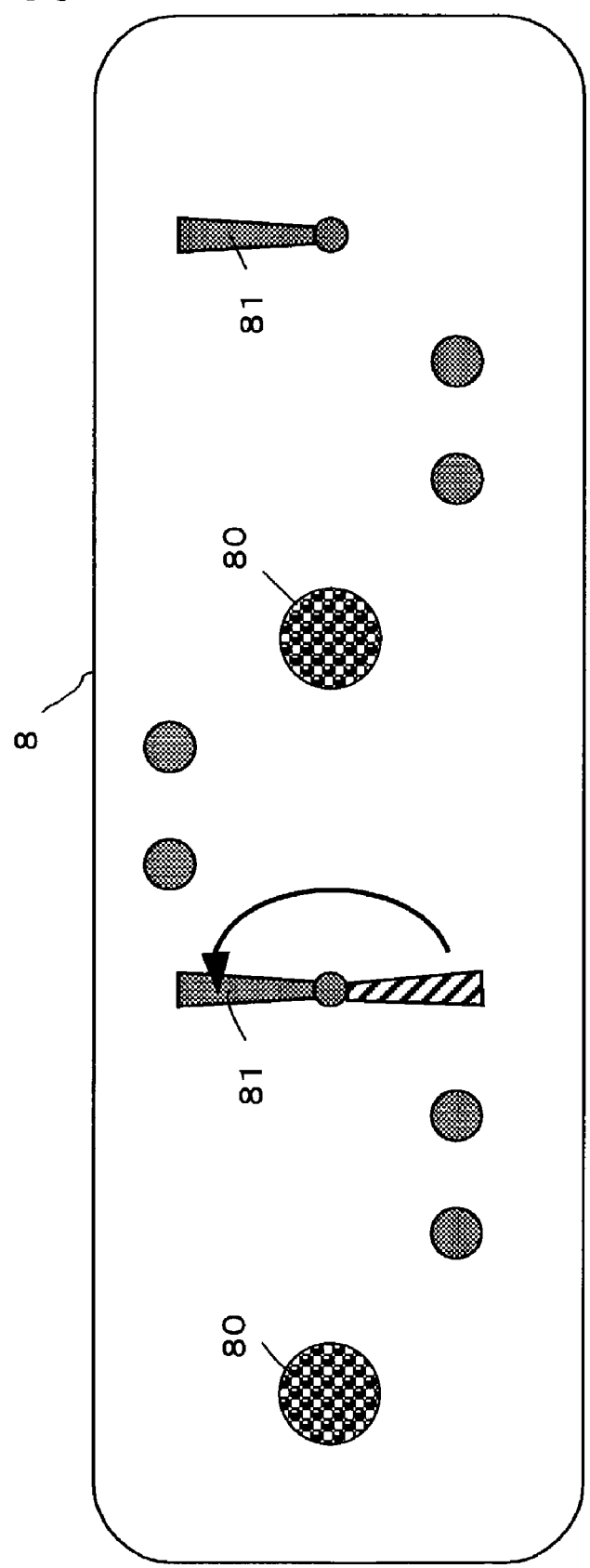
FIG. 16 is a diagram showing an example controller 8 provided for a control panel belonging to an information processing apparatus for controlling execution of a baseball simulation game program.

FIG. 16 is a diagram showing an example controller 8, provided for the control panel (not shown) attached to an information processing apparatus, for controlling execution of a baseball simulation game program. As will be described later, the controller 8 includes a joystick (direction key) 80 for predicting and selecting a pitch type for the pitcher character displayed on the display monitor 6 and for controlling the cursor position, and a lever 81 used when hitting a ball.

The right and the left halves of the controller 8 have the same specifications, and permit two persons to participate in a baseball game. In this case, a first player operates a pitcher as a displayed character, and a second player operates a batter as another displayed character. When only one person plays the baseball game, the program running on the information processing apparatus operates the displayed pitcher character, while the player operates the displayed batter character.

Figure 17:
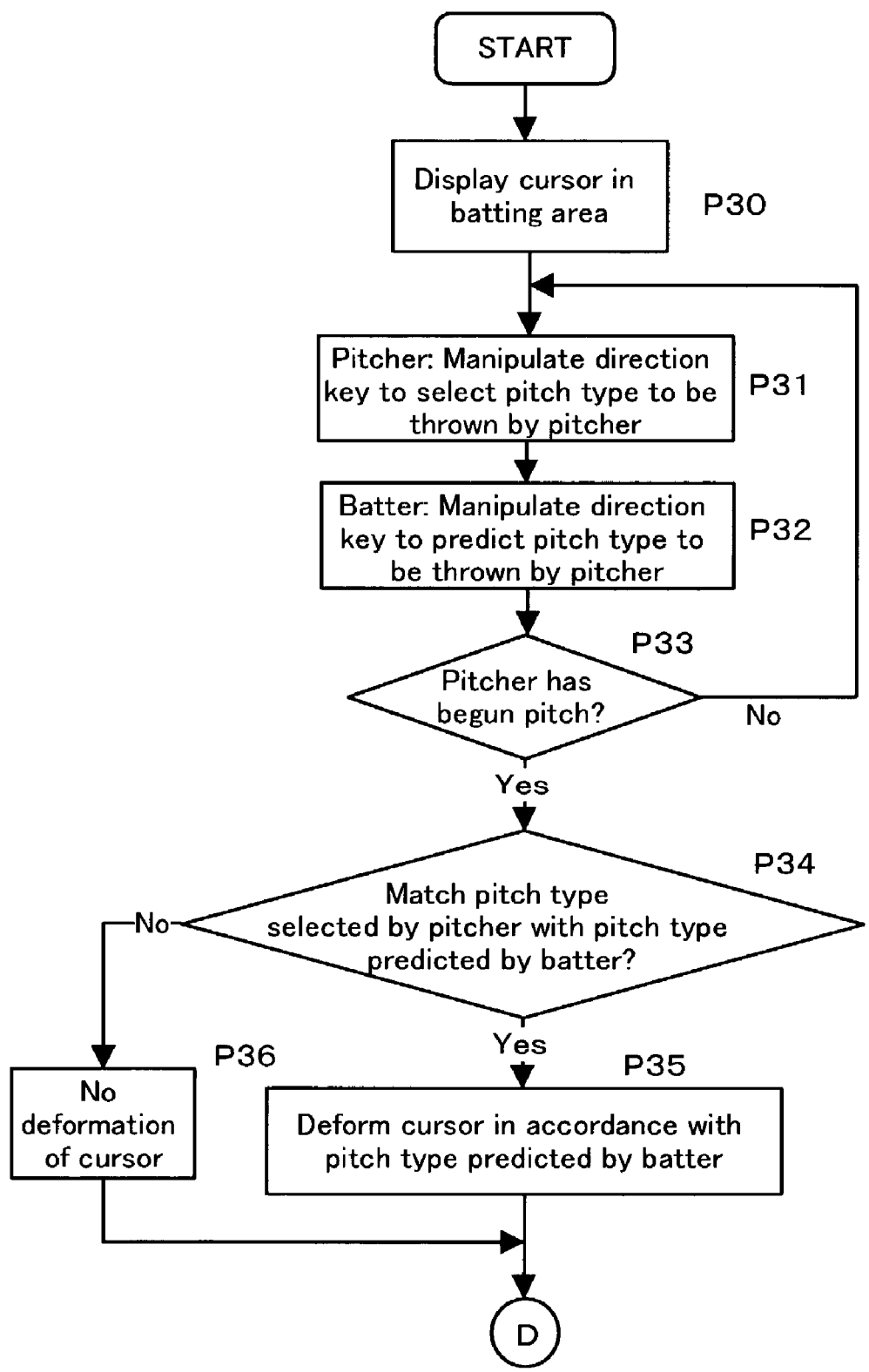
FIG. 17 is a flowchart (1) for explaining the features of control by a program executed using the controller 8 for a baseball simulation game according to the present invention.
Figure 18:
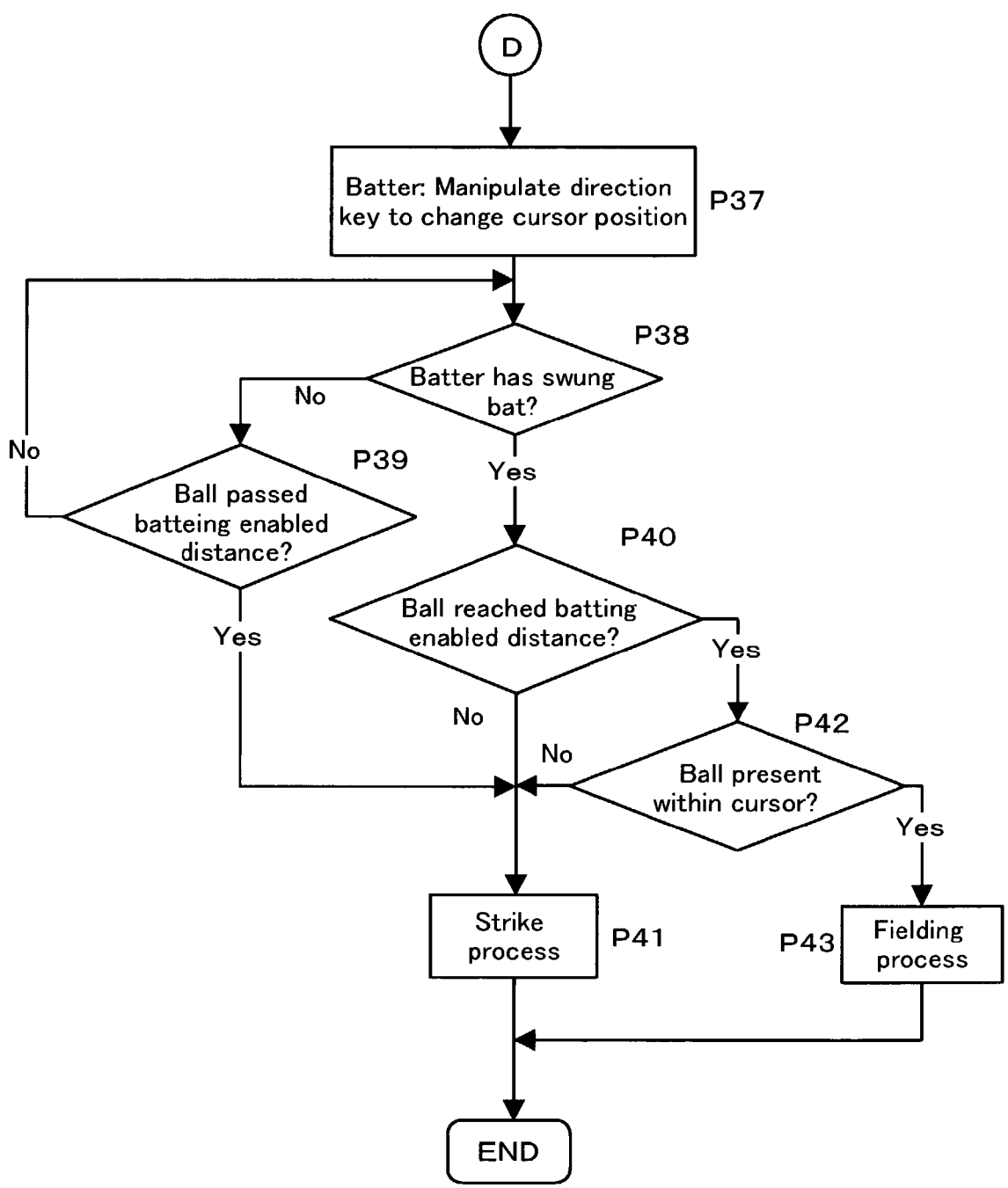
FIG. 18 is a flowchart (2) for explaining the features of control by a program executed using the controller 8 for a baseball simulation game according to the present invention.

FIGS. 17 and 18 are flowcharts for explaining the features of control of the baseball game program executed using the controller 8 provided for a control panel (not shown) for a baseball game according to the present invention.

Figure 19:
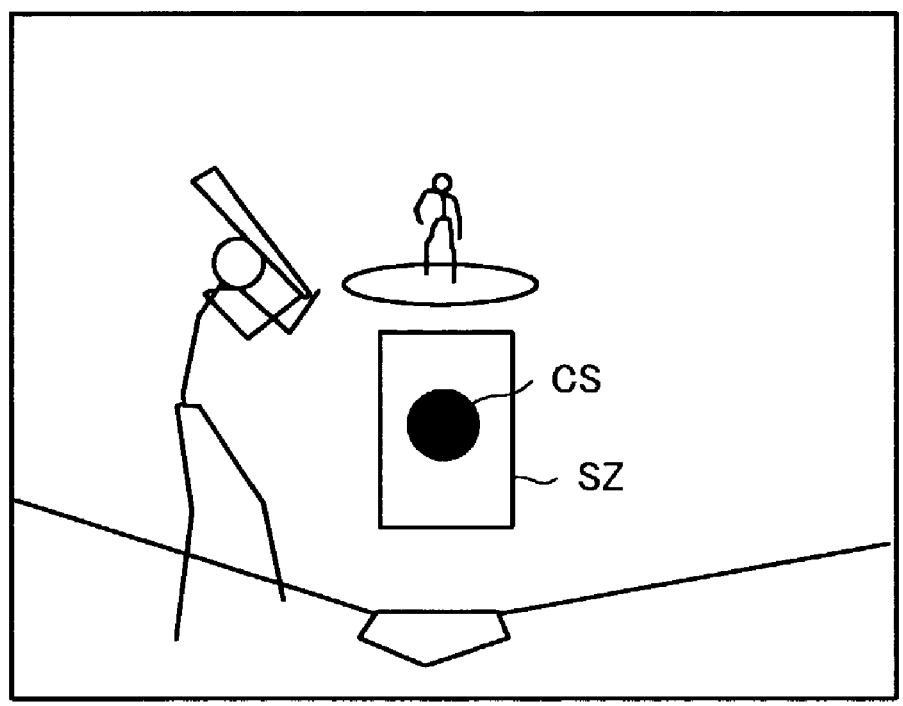
FIG. 19 is a diagram for explaining step P30 in the processing in FIG. 17.

In FIG. 17, at the start of the game program, a strike zone SZ and a cursor CS are displayed in the batting area on the display monitor 6 as shown in FIG. 19 (step P30).

The player operating the pitcher character manipulates the direction key 80 of the controller 8 to select and enter the pitch type to be thrown by the pitcher (step P31). To select the pitch type for the pitcher, the direction key 80 is pushed in a direction corresponding to an arrow emanating from the ball in FIG. 15 which represents the selected pitch type. At this time, the selected pitch type for throwing is not displayed on the monitor 6.

The player who operates the batter predicts which pitch type will be thrown by the pitcher, and enters it by manipulating the direction key 80 in the same manner as is described above (step P32).

The above process is completed before the pitcher begins to deliver the pitch in accordance with the program (step P33).

Then, when the pitcher starts to deliver the pitch in accordance with the program (Yes at step P33), CPU determines whether the pitch type thrown by the pitcher matches the one predicted by the player operating the batter according to the program (step P34). This determination is made possible by comparing a parameter for identifying the pitch type thrown by the pitcher with a parameter for identifying the pitch type predicted by the player.

When the pitch type thrown by the pitcher matches the pitch type predicted by the player who operates the batter, CPU 2 reads out data for displaying the shape of the cursor CS corresponding to the type of the pitch predicted and selected by the batter operating player from a storage device or recording medium 1, sends it to DSP 4, and performs an image processing. Thereby, a cursor changed in shape will be displayed (step P35). When it does not match, the data for representing the cursor CS is not altered, and the shape of the circular cursor CS shown in FIG. 19 is not altered (step P36).

At step P35, a case that the pitch type delivered by the pitcher matches the pitch type predicted by the batter-side player is employed as a condition for changing the shape of the cursor to correspond with the pitch type. However, after the ball has been pitched, the shape of the cursor CS may be changed unconditionally in accordance with the pitch type predicted by the batter-side player.

Figure 20:
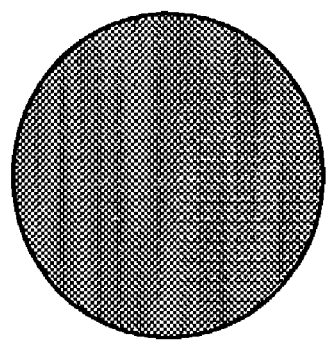
FIG. 20 is a group of diagrams for example cursor shapes.
Figure 20:
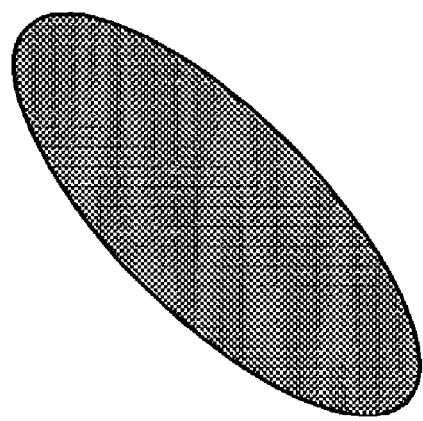
Figure 20:
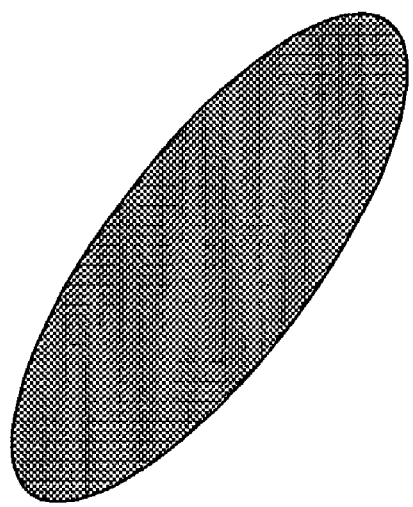

Example cursor shapes are shown in FIGS. 20A to 20C. In FIG. 20A the ball-shaped cursor is not deformed. Whereas in FIG. 20B, when a right slider is predicted, the shape of the cursor CS is extended in the direction in which the ball will swerve to the right, and in FIG. 20C, when a left slider is predicted, the shape of the cursor CS is also extended in the direction in which the ball will swerve to the left.

Following the processing in FIG. 18, the player who operates the batter character predicts the course of the ball by manipulating the direction key 80, and changes the position of the cursor CS (step P37).

Figure 21:
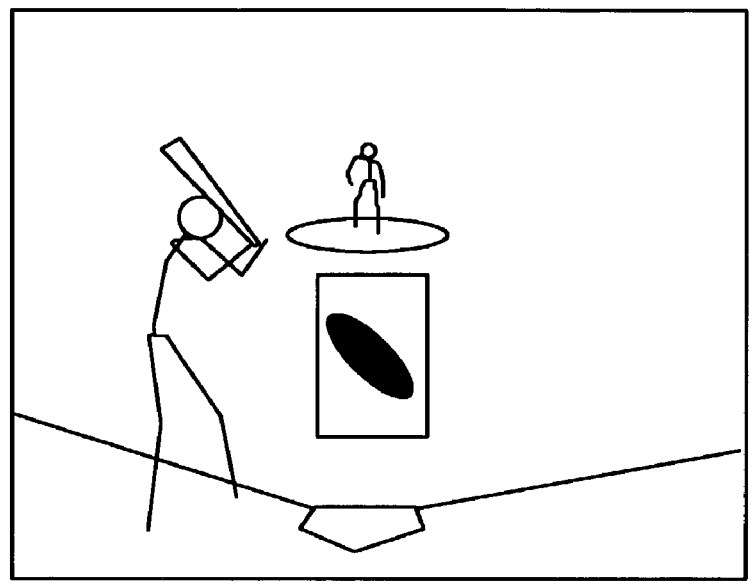
FIG. 21 is a diagram for explaining step P37 in the processing in FIG. 18.

This process is shown in FIGS. 21 to 24. In FIG. 21, a right slider is predicted, and the cursor CS is deformed as is shown in FIG. 20B, while its position is not changed.

Figure 22:
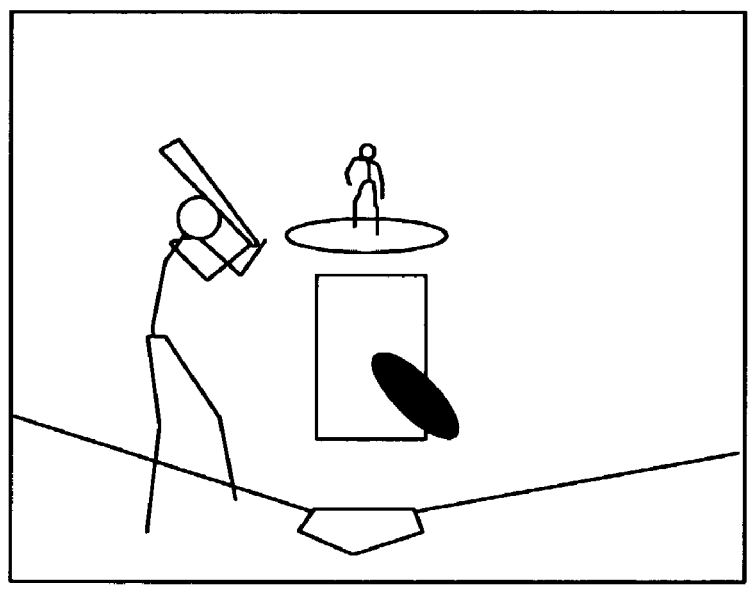
FIG. 22 is a diagram for explaining step P37 in the processing in FIG. 18.
Figure 23:
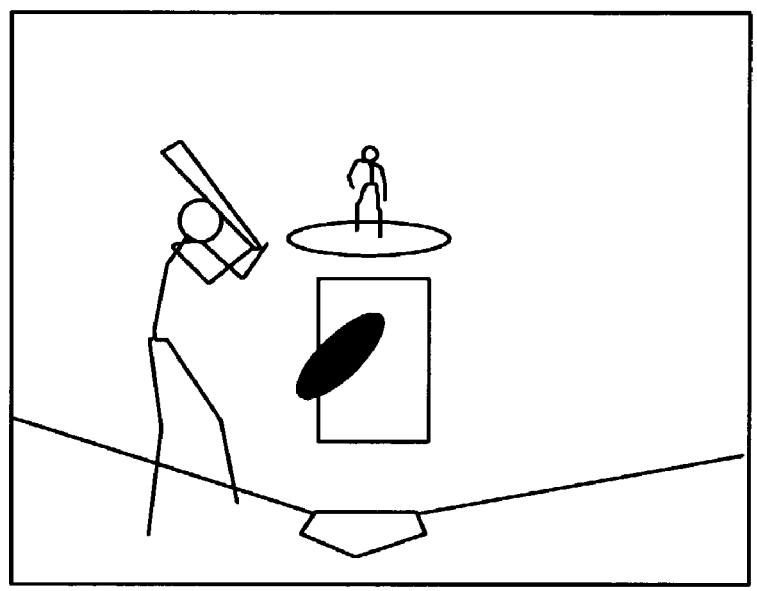
FIG. 23 is a diagram for explaining step P37 in the processing in FIG. 18.

In FIG. 22, the cursor CS is moved from the state in FIG. 21 to the lower right. And in FIG. 23, the cursor CS is deformed as is shown in FIG. 20C, and is moved to the left.

Figure 24:
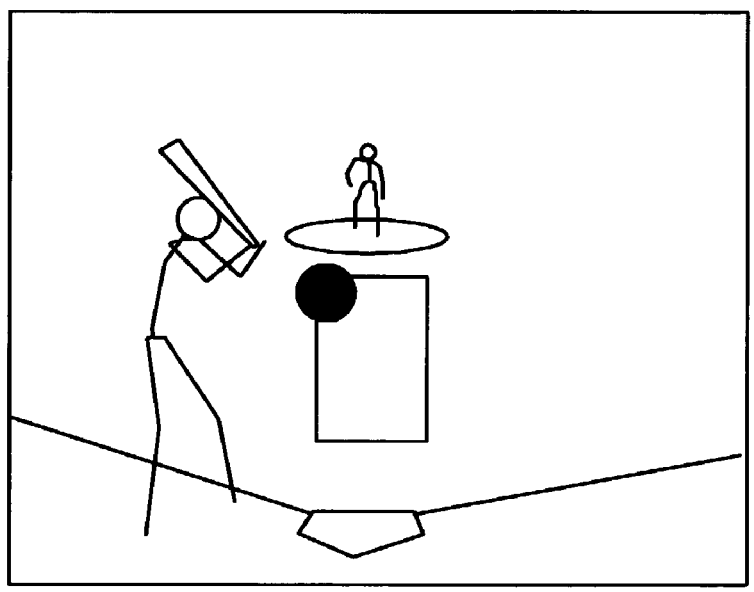
FIG. 24 is a diagram for explaining step P37 in the processing in FIG. 18.

In FIG. 24, the cursor CS is moved to the upper left but is not deformed.

Hereupon, control of the movement of the position of the displayed cursor CS is performed as follows. CPU 2 detects inputs by the player using the joystick 80. Then, CPU 2 sends the movement amount data of the detected cursor CS to DSP 4. DSP 4 updates the displayed coordinates of the cursor CS in accordance with the movement amount data. Accordingly, the cursor CS having predetermined shape is displayed at the updated position.

Referring again to FIG. 18, a check is performed to determine whether the batter character has swung the bat (step P38).

The lever 81 of the control panel 8 is usually positioned upright as shown in FIG. 16, and to swing the bat, the player pivots the lever 81 to the right within an angle range of 180 degrees, and releases it. This operation gives a bat swinging state. The lever 81 is then pivoted along the arrow shown at the left side of the controller 8 in FIG. 16 upward from the position and is rotated and returned to its original upright position by device of a spring mechanism for returning.

When the player pivots the lever 81 to the right within the 180 degree angle range, the angle attained corresponds to the batting strength and is provided as one parameter of the program for fielding a ball which is hit.

When it is determined that the player has not made the batter character swing the bat(No at step P38) and the ball has passed beyond the distance at which batting is enabled (Yes at step P39), a strike swing process is performed (step P41).

When it is determined that the player has made the batter character swing the bat (Yes at step P38), a check is performed to determine whether the ball has reached the distance at which batting is enabled (step P40). When the ball has not reached the batting enabled distance (No at step P40), the strike swing process is also performed (step P41).

Hereupon, the distance at which batting is enabled is determined by the elapsed time from the moment the ball is thrown.

When the ball has reached the batting enabled distance (Yes at step P40), a check is performed to determine whether the ball is present within the cursor (step P42). When the ball is not within the cursor (No at step P42), the strike swing process is performed (step P41). And when the ball is within the cursor (Yes at step P42), a fielding process is performed (step P43).

As the fielding process, CPU 2 detects parameters such as the batting strength which corresponds to the pivoting angle (rotational angle) of the lever 81, the position of the cursor CS, and whether the ball entered a position within the cursor CS, and processes previously set as program data corresponding to the combination of the detected parameters are executed. Since the fielding process is not directly related to the feature of the present invention, no detailed explanation for it will be given.

Hereupon, a program according to the present invention is not limited to the above-described golf game and baseball game, and is also applicable to other ball sports simulation games.

For example, it is possible to take a penalty kick in a football game into such a game.

This can be processed in the same way as in a baseball game in which a player predicts a pitch or ball movement type and selects the shape and the position of the cursor CS.

Figure 25:
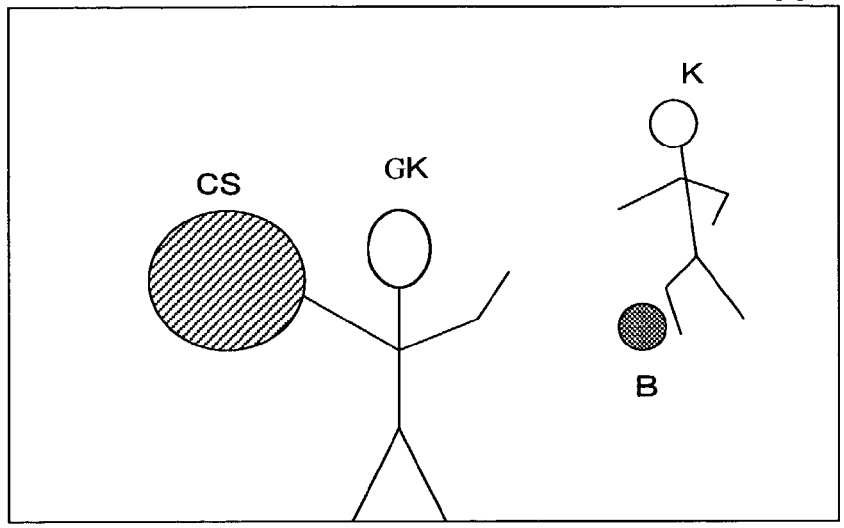
FIG. 25 is a diagram showing a model view of a penalty kick in a football game displayed on a display monitor 6.
Figure 25:
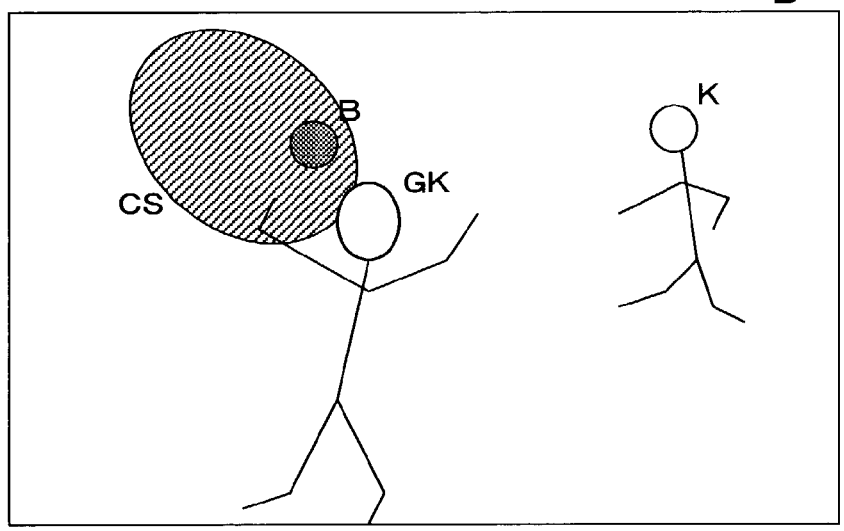
Figure 25:
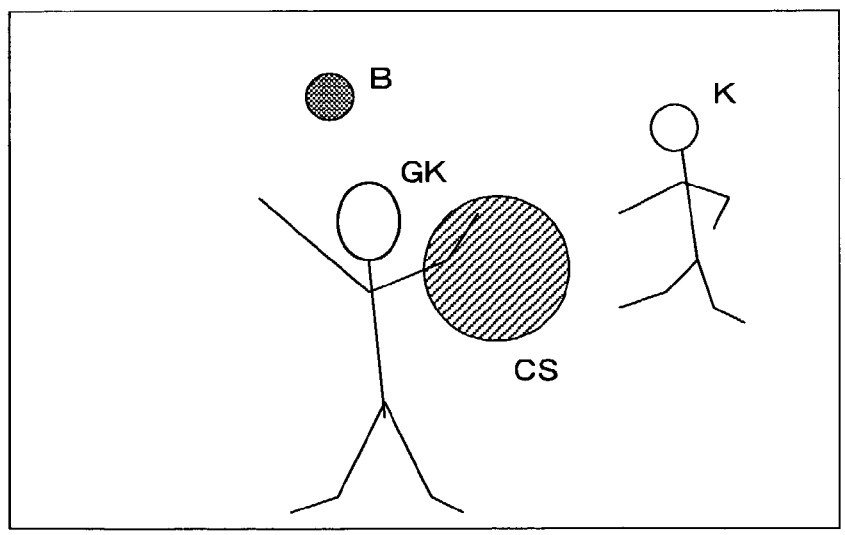

FIG. 25 shows a model view of a penalty kick in a football game displayed on a display monitor 6.

In FIG. 25A, characters of a kicker K and of a goalkeeper GK are shown, and a player predicts the ball movement type of a football B the kicker kicks that is operated according to a second plyaer or a program. The display of the shape and the position of the cursor CS is controlled so that the catching is regarded as valid, by whether this prediction and the ball movement type of the football B kicked by the kicker K matches each other or not.

The prediction of the ball movement type selection of the football B is entered using a controller 8 in the same way as has been previously explained for a baseball game.

FIGS. 25B and 25C each show the relationship between the represented cursor CS corresponding to the ball movement type selected by a player and the football B kicked by the kicker character K.

CPU 2 determines, according to a program, whether the ball movement type predicted by a player matches the set ball movement type of the ball kicked by the kicker K. The determination by CPU 2 is made possible by comparing the parameter for specifying the ball movement type of the ball kicked by the kicker K and the parameter for specifying the ball movement type predicted by the player.

When the ball movement type of the ball kicked by the kicker K matches the ball movement type predicted by the goalkeeper side player, CPU 2 reads out the data for displaying a cursor CS in the shape corresponding to the one predicted and selected by the player operating the goalkeeper GK from a program data storage device or recording medium 1, send it to DSP 4, and image processing is performed. Accordingly, a deformed cursor CS is displayed. On the other hand, if they do not match, the data regarding the ball movement type of the ball for displaying the cursor CS is not changed and the cursor is not deformed.

FIG. 25B shows a case in which the ball movement type predicted by the goalkeeper side player matches the set ball movement type kicked by the kicker K, with the result that the position and the shape of the cursor CS is changed and the ball B has come within the cursor CS.

FIG. 25C shows a case in which the ball movement type predicted by the goalkeeper side player does not match the ball movement type set by the program side, with the result that the shape of the cursor CS is not changed, and only the position is moved. In this case, the ball B is out of the cursor CS.

According to the program, CPU 2 determines whether the displayed position (coordinate) of the ball B matches the scope of the cursor CS, in the relationship shown in FIGS. 25B and 25C. FIG. 25B shows a case in which the displayed position (coordinate) of the ball B matches the scope of the cursor CS, indicating that the catching of the ball by the goalkeeper is regarded as successful. FIG. 25C shows a case in which the displayed position (coordinate) of the ball B does not match the scope of the cursor CS, indicating that the catching of the ball by the goalkeeper GK is regarded as unsuccessful.

Based on this determination, a scoring process is performed according to the program, and the football game continues. The scoring process is not directly related to the present invention, and therefore is not described for further explanation.

Figure 26:
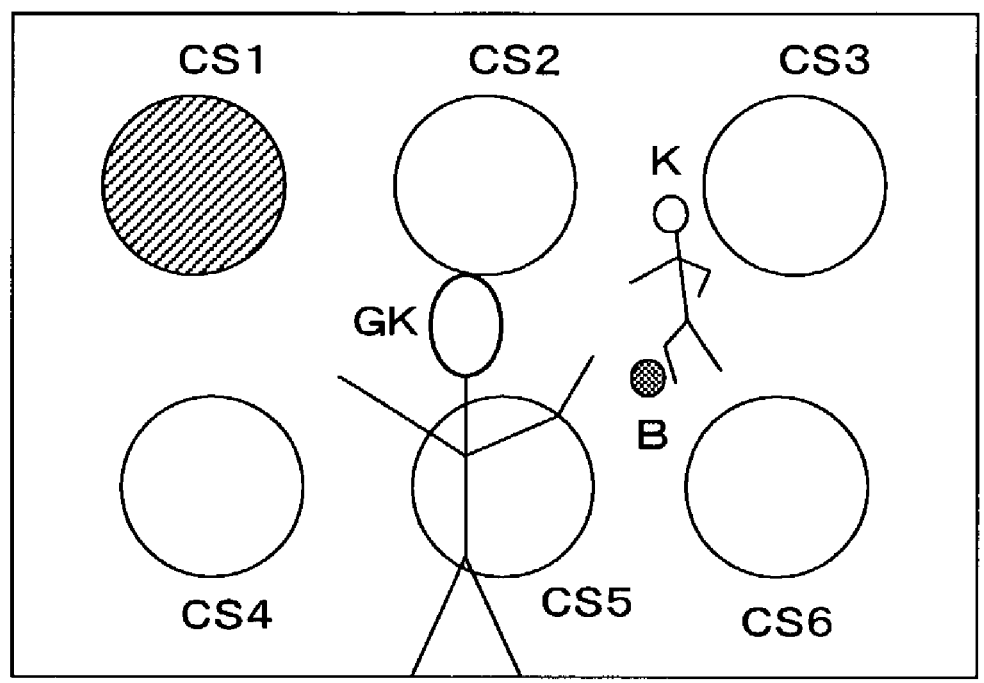
FIG. 26 is a diagram for explaining another example showing the ball movement type predicted by a player.

FIG. 26 is another example showing prediction of the ball movement type performed by a player. In this case, a plurality of positions of cursors CS's (CS1–CS6) displayed on a screen are previously set as a program data.

A player predicts the ball movement type of the bal B kicked by a kicker K and selects an optimum cursor CS among the plurality of cursors CS1–C6 based on the predicted ball movement type. Accordingly, CPU 2 determines whether the set direction of the ball B kicked by the kicker K matches the position of the cursor CS selected by the player. Based on the determination, a scoring process is performed according to the program, and the football game continues.

In the example shown in FIG. 26, as compared with the example shown in FIG. 25, processing of the program is controlled so that the shape of the cursor CS is not modified, and a cursor is selected from the CS's the positions of which are previously set, and therefore, the processing is easy and load on CPU 2 will be alleviated.

As is described above while referring to the drawings, according to the embodiment of the present invention, a game can be executed which can provide for a player sensations similar to those experienced while engaging in actual sports.

It is to be noted that ball sports for the simulation games according to the present invention can include golf, baseball, cricket, polo, football, American foot ball, rugby football, tennis, table tennis, and any other known ball sports wherein striking or hitting of a ball is required for traveling of the ball in the air, unless a specific type of sports is referred.

What is claimed is:

1. A recording medium storing a game program, which is executable by a controller for performing a golf simulation game, the game program causing said controller to perform acts comprising:

detecting a target traveling distance setting value of a golf ball by an operation value in −Y direction, and an operating angle in first +/−X directions by an operation value in +/−X directions, on inputting an operation value in −Y direction, which are set by an operation of a player using an input device inputting the operation value in +/−Y directions and +/−X directions;

detecting a swing value by the operation value in +Y direction, and an operating angle in second +/−X directions by the operation value in +/−X directions on inputting the operation value in +Y direction, which are set by said player using the input device;

determining a traveling distance by adjusting a distance by said detected swing value corresponding to said detected target traveling distance setting value; and determining a flight mode of said golf ball by synthesizing the operation value in said first +/−X directions on inputting the operation value in −Y direction and said second +/−X directions on inputting the operation value in +Y direction, which are set by said player using the input device.

2. The recording medium according to claim 1, wherein said game program further causes said controller to perform acts comprising:

detecting an additional operation value in +Y or −Y direction inputted by said input device within a predetermined period of time from the inputted time of the operating value in said +Y direction;

setting a move direction and a distance from a position where said golf ball has landed corresponding to the detected additional operation value in said +Y or −Y direction.

3. The recording medium according to claim 1, wherein said flight mode includes either a slice, during which said golf ball curves to the right in flight, or a hook, during which said golf ball curves to the left in flight.

4. An information processing apparatus comprising:

a storage device storing a program for controlling execution of a ball sports simulation game;

an input device inputting a operating value in +/−X and +/−Y directions by an operation of a player; and a controller being controlled by said program, wherein said program causes said controller to perform acts comprising:

detecting a target traveling distance setting value of a golf ball by an operation value in −Y direction, and an operating angle in first +/−X directions by an operation value in +/−X directions, on inputting the operation value in −Y direction, which are set by an operation of a player using an input device inputting the operation value in +/−Y directions and +/−X directions;

detecting a swing value by the operation value in +Y direction, and an operating angle in second +/−X directions by the operation value in +/−X directions, or inputting the operation value in +Y direction, which are set by said player using said input device;

determining a traveling distance by adjusting a distance by said detected swing value corresponding to said detected target traveling distance setting value; and determining a flight mode of the golf ball by synthesizing the operation value in said first +/−X directions on inputting the operation value in −Y direction and said second +/−X directions on inputting the operation value in +Y direction, which are set by said player using the input device.

5. The information processing apparatus according to claim 4, said input device further comprising a track ball, wherein the operation value in said +/−Y directions and +/−X directions is inputted in said input device by said track ball.

* * * * *